United States Patent
Yasui et al.

(10) Patent No.: US 7,997,373 B2
(45) Date of Patent: Aug. 16, 2011

(54) STEERING CONTROL DEVICE FOR VEHICLE

(75) Inventors: Yoshiyuki Yasui, Nagoya (JP); Hideaki Koto, Anjyo (JP); Kenji Asano, Toyota (JP)

(73) Assignee: Advics Co., Ltd., Kariya, Aichi-Pref. (JP)

( * ) Notice: Subject to any disclaimer, the term of this patent is extended or adjusted under 35 U.S.C. 154(b) by 491 days.

(21) Appl. No.: 12/241,209

(22) Filed: Sep. 30, 2008

(65) Prior Publication Data

US 2009/0095562 A1 Apr. 16, 2009

(30) Foreign Application Priority Data

Oct. 16, 2007 (JP) ................................. 2007-269174

(51) Int. Cl.
*B60K 28/16* (2006.01)
*B62D 6/00* (2006.01)
(52) U.S. Cl. .......................... 180/197; 180/446; 701/41
(58) Field of Classification Search .................. 180/197, 180/446; 701/41; 303/146
See application file for complete search history.

(56) References Cited

U.S. PATENT DOCUMENTS

| | | | | |
|---|---|---|---|---|
| 5,839,798 A | * | 11/1998 | Monzaki et al. | 303/146 |
| 6,276,766 B1 | * | 8/2001 | Yamada | 303/154 |
| 6,286,915 B2 | * | 9/2001 | Matsuno | 303/146 |
| 6,415,215 B1 | * | 7/2002 | Nishizaki et al. | 701/70 |
| 7,066,560 B2 | * | 6/2006 | Kato et al. | 303/140 |
| 7,302,328 B2 | | 11/2007 | Kato et al. | |
| 2001/0056317 A1 | * | 12/2001 | Nishizaki et al. | 701/48 |
| 2005/0256620 A1 | * | 11/2005 | Kato et al. | 701/41 |
| 2005/0273235 A1 | * | 12/2005 | Ohta et al. | 701/41 |
| 2008/0142293 A1 | * | 6/2008 | Goto et al. | 180/446 |

FOREIGN PATENT DOCUMENTS

JP 2005-112285 A 4/2005

\* cited by examiner

*Primary Examiner* — Paul N Dickson
*Assistant Examiner* — Daniel Yeagley
(74) *Attorney, Agent, or Firm* — Buchanan Ingersoll & Rooney PC

(57) ABSTRACT

A steering control device for a vehicle includes a first adjustment value determination means for determining a first adjustment value of a value corresponding to a wheel steering angle based on an actual value and a target value of turning state quantity, the first adjustment value is a value directing to approximate the actual value to the target value, and a steering control means for adjusting the wheel steering angle by modifying the value corresponding to the wheel steering angle based on the first adjustment value, wherein the first adjustment value determination means includes an index value obtaining means for obtaining an index value indicating a probability of an occurrence of a side-slip of a wheel and a regulation means for regulating the first adjustment value so that the greater the probability of the occurrence of the side-slip is, the smaller the first adjustment value is set to be.

3 Claims, 17 Drawing Sheets

STEERING CONTROL DEVICE FOR VEHICLE

This application is based on and claims priority under 35 U.S.C. §119 to Japanese Patent Application 2007-269174, filed on Oct. 16, 2007, the entire contents of which is incorporated herein by reference.

FIELD OF THE INVENTION

The present invention relates to a steering control device for a vehicle.

BACKGROUND

In a case where a slip restraining control for restricting an occurrence of a slip at a wheel, such as a so-called anti-skid control (ABS control), a so-called traction control (TCS control) and the like is executed while a vehicle travels on a road surface having different friction coefficients in a lateral direction corresponding to a right-left direction of the vehicle (hereinafter referred to as a μ split road surface and a control for restricting the occurrence of the slip at the wheel while the vehicle travels the μ split road surface is referred to as a μ split control), a difference is generated between a longitudinal force of right wheels (hereinafter referred to as a right-wheel longitudinal force) and a longitudinal force of left wheels (hereinafter referred to as a left-wheel longitudinal force). The longitudinal force is a frictional force in an acceleration-deceleration direction generated between the road surface and a tire. Additionally, the longitudinal force is referred to also as a braking/driving force. A yaw moment for deflecting the vehicle is generated due to the difference between the right-wheel longitudinal force and the left-right longitudinal force (hereinafter referred to as a longitudinal force difference attributing yaw moment).

In order to prevent the deflection of the vehicle, occurring due to the longitudinal force difference attributing yaw moment, a yaw moment needs to be generated in a direction where the longitudinal force difference attributing yaw moment is reduced (offset) by adjusting the steering angle of the front-wheels to be directed opposite from a vehicle deflecting direction. An adjusting operation of the front-wheel steering angle to be directed in a direction opposite from the vehicle deflecting direction is referred to as a counter-steering operation.

A steering control device disclosed in JP2005-112285A automatically executes the counter-steering operation without involving a steering wheel operation by a driver (hereinafter referred to also as a counter-steering control). More specifically, a reference steering angle of the front wheels is determined on the basis of a rotational angle of a steering wheel. A first adjustment steering angle of the front wheels directed so as to restrain the vehicle deflection, occurring due to the difference between the right-wheel longitudinal direction and the left-wheel longitudinal direction, is determined. Then, a second adjustment steering angle of the front wheels, directed so as to approximate an actual value to a target value (i.e. directed so as to approximate a deviation in motion state quantity to zero), is determined on the basis of a deviation between the actual value and the target value of the motion state quantity in a yaw direction of the vehicle (i.e. deviation in the motion state quantity, such as a deviation between a target yaw rate and an actual yaw rate, and the like). A target steering angle of the front-wheels is determined by adding the first and the second adjustment steering angles to the reference steering angle. Then, the front-wheels are controlled by means of an actuator so that the actual steering angle of the front-wheels corresponds to the target steering angle in the steering angle control device disclosed in JP2005-112285A.

In the counter-steering control executed in the steering control device disclosed in JP2005-112285A, the reference steering angle is adjusted by using not only a feed-forward control utilizing the first adjustment steering angle, determined on the basis of the longitudinal force difference between the right and left wheels, but also a feedback control utilizing the second adjustment steering angle, determined on the basis of the deviation in the motion state quantity, for the following reasons. If the vehicle deflection, occurring due to the longitudinal force difference, is accurately prevented only by the feed-forward control utilizing the first adjustment steering angle, the feedback control utilizing the second adjustment steering angle is not needed. However, an error of detecting the longitudinal force difference used for calculating the first adjustment steering angle, fluctuation in changing characteristics of the yaw moment relative to changes of the front-wheel steering angle and the like unavoidably occur, which results in generating an error in the feed-forward control utilizing the first adjustment steering angle. The error in the feed-forward control emerges as the deviation in the motion state quantity. Therefore, in order to compensate the error in the feed-forward control utilizing the first adjustment steering angle, the feedback control utilizing the second adjustment steering angle, determined on the basis of the deviation in the motion state quantity, is also executed.

FIG. 19 illustrates a case where the μ split control is started when a brake operation is performed while the vehicle is driven on the μ split road surface, which curves towards the left in FIG. 19 and where the friction coefficient of road surface contacting turning inner wheels is low (low μ) and the friction coefficient of the road surface contacting turning outer wheels is high (high μ). In this case, the difference in the longitudinal forces occurs, thereby generating the longitudinal force difference attributing yaw moment in a turning outer direction (a clockwise direction when the vehicle is viewed from above), as illustrated in FIG. 19.

When the counter-steering control is executed while the vehicle is in the above-described state, the front-wheel steering angle is adjusted to a direction by which the front-wheel steering angle is increased towards the turning inner side by the first and the second adjustment steering angles. In other words, the counter-steering operation is automatically executed in the above-described state. As a result, the deflection of the vehicle, occurring due to the longitudinal force difference, is appropriately restricted.

On the other hand, FIG. 20 illustrates a case where the brake operation is performed while the vehicle travels on a road surface curving towards the left in FIG. 20 and having a constant friction coefficient, specifically, a constant low μ of the friction coefficient. In this case, the longitudinal force difference attributing yaw moment is not generated because the difference in the longitudinal forces does not occur. However, understeer may occur in this case. An understeer tendency emerges as the deviation in the motion state quantity, i.e. the target yaw rate becomes larger than the actual yaw rate.

In a case where the counter-steering control is executed in the state where the understeer occurs at the vehicle, the first adjustment steering angle based on the longitudinal force difference is calculated as zero, or a value approximating to zero, because the longitudinal force difference does not occur. On the other hand, the second adjustment steering angle based on the deviation in the motion state quantity is determined to be a value by which the front-wheel steering angle is increased towards the turning inner side (i.e. towards the left in FIG. 20) in order to approximate the deviation in the motion state quantity to zero, for example, by increasing the actual yaw rate. As a result, the front-wheel steering angle is adjusted to the direction by which the front-wheel steering angle is increased towards the turning inner side (i.e. towards the left in FIG. 20) by the second adjustment steering angle.

In the case where the understeer occurs at the vehicle, a lateral force (a cornering force), which may be generated at the front-wheels, has already saturated, therefore, even if the front-wheel steering angle is increased towards the turning inner side, the lateral force is not increased. Hence, in the situation where the understeer tends to occur, i.e. the situation where a side-slip tends to occur at the wheel, it may be preferable that the front-wheel steering angle is prevented from being adjusted by the second adjustment steering angle to the direction by which the front-wheel steering angle is increased towards the turning inner side.

Described above is the case where an adjustment control of the front-wheel steering angle is executed as the counter-steering control. The above-described phenomena also occur in a case where the adjustment control is executed on a rear-wheel steering angle as the counter-steering control. The case where the adjustment control is executed on the rear-wheel steering angle as the counter-steering control will be described in detail in accordance with FIGS. 21 and 22. FIGS. 21 and 22 illustrate a case where the rear-wheel steering angle (reference angle) is controlled in the same direction as the front-wheel steering angle is controlled, in response to the front-wheel steering angle.

FIG. 21 illustrates a case where the μ split control is started by performing the brake operation while the vehicle travels the μ split road surface turning towards the left in FIG. 21 and having a high friction coefficient (high μ) at the turning inner side and a low friction coefficient (low μ) at the turning outer side. In this case, the difference in the longitudinal forces is generated, thereby generating the longitudinal force difference attributing yaw moment in a direction towards the turning inner side (i.e. in a counterclockwise direction when the vehicle is viewed from above), as illustrated in FIG. 21.

If the same counter-steering control as the one executed to adjust the front-wheel steering wheel is executed on the rear-wheel steering angle in order to generate a yaw moment for reducing (offsetting) the longitudinal force difference attributing yaw moment, the rear-wheel steering angle is adjusted to a direction by which the rear-wheel steering angle is increased towards the turning inner side by the first and the second adjustment steering angles. As a result, the vehicle deflection occurring due to the difference in the longitudinal forces is appropriately prevented.

On the other hand, FIG. 22 illustrates a case where the brake operation is performed while the vehicle travels on a road surface curving towards the left in FIG. 22 and having a constant friction coefficient, specifically, a constant low μ of the friction coefficient. In this case, the longitudinal force difference attributing yaw moment is not generated because the difference in the longitudinal forces does not occur. However, oversteer may occur in this case. An oversteer tendency emerges as the deviation in the motion state quantity, i.e. the actual yaw rate becomes larger than the target yaw rate.

In the case where the counter-steering control is executed on the rear-wheel steering angle in the state where the oversteer occurs at the vehicle, the first adjustment steering angle based on the longitudinal force difference is calculated as zero, or the value approximating to zero, because the longitudinal force difference does not occur. On the other hand, the second adjustment steering angle based on the deviation in the motion state quantity is determined to be the value by which the rear-wheel steering angle is increased towards the turning inner side (i.e. towards the left in FIG. 20) in order to approximate the deviation in the motion state quantity to zero, for example, by decreasing the actual yaw rate. As a result, the rear-wheel steering angle is adjusted to the direction by which the rear-wheel steering angle is increased towards the turning inner side (i.e. towards the left in FIG. 20) by the second adjustment steering angle.

In the case where the oversteer occurs at the vehicle, the lateral force (the cornering force), which may be generated at the rear-wheels, has already saturated, therefore, even if the rear-wheel steering angle is increased towards the turning inner side, the lateral force is not increased. Hence, in the case where the adjustment control is executed on the rear-wheel steering angle as the counter-steering control, if the vehicle is in a state where the oversteer tends to occur (i.e., a state where the side-slip tends to occur at the wheel), it may be preferable that the rear-wheel steering angle is prevented from being adjusted by the second adjustment steering angle to the direction by which the rear-wheel steering angle is increased towards the turning inner side.

A need thus exists to provide a steering control device for a vehicle executing at least a counter-steering control of adjusting a steering angle of a wheel by an adjustment steering wheel on the basis of a motion state quantity (a motion state quantity deviation) in a yaw direction, that appropriately determines the adjustment steering angle in a state where a side-slip of the wheel tends to occur.

SUMMARY OF THE INVENTION

According to an aspect of the present invention, a steering control device for a vehicle, which is adapted to the vehicle that is configured to adjust a steering angle of a wheel independently from an operation of a steering operation member by a driver, includes a first adjustment value determination means for determining a first adjustment value of a value corresponding to the steering angle of the wheel on the basis of an actual value of turning state quantity and a target value of turning state quantity in a yaw direction of the vehicle, the first adjustment value is a value directing to approximate the actual value of turning state quantity to the target value of turning state quantity, and a steering control means for adjusting the steering angle of the wheel by modifying the value corresponding to the steering angle of the wheel on the basis of the first adjustment value, wherein the first adjustment value determination means includes an index value obtaining means for obtaining an index value indicating a probability of an occurrence of a side-slip of the wheel and a regulation means for regulating the first adjustment value so that the greater the probability of the occurrence of the side-slip of the wheel, indicated by the index value, is, the smaller the first adjustment value is set to be.

BRIEF DESCRIPTION OF THE DRAWINGS

The foregoing and additional features and characteristics of the present invention will become more apparent from the following detailed description considered with the reference to the accompanying drawings, wherein.

DETAILED DESCRIPTION

An embodiment of a steering control device for a vehicle (which will be referred to as a steering control device hereinafter) will be described below in accordance with the attached drawings.

Figure 1:
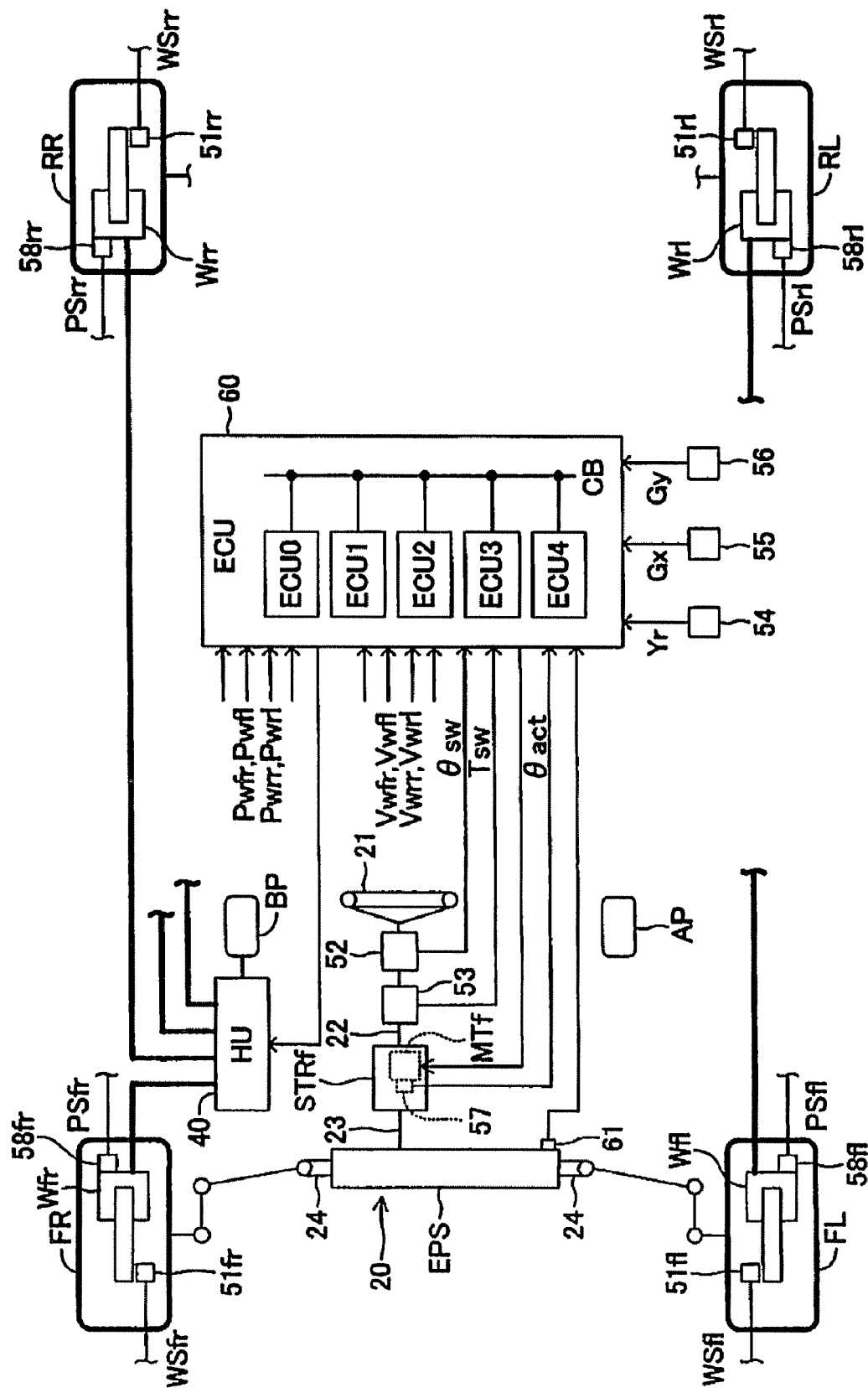
FIG. 1 is a configuration diagram schematically illustrating a vehicle to which a steering control device according to an embodiment is mounted.

FIG. 1 schematically illustrates a configuration of the vehicle to which the steering control device according to the embodiment is adapted. The steering control device is adapted to the vehicle that is configured to adjust a steering angle of front-wheels independently from an operation of a steering operation member by a driver. Further, the steering control device includes a front-wheel steering control mechanism 20 and a hydraulic unit 40.

In the front-wheel steering control mechanism 20, a steering wheel 21 (a steering operation member), operated by the driver, is connected to an electronic power steering system (EPS) via an upper steering shaft 22, a variable steering gear ratio system VGRS (STRf) and a lower steering shaft 23. By the above-described configuration of the front-wheel steering control mechanism 20, a rotation of the steering wheel 21 is transmitted to the EPS.

The EPS is configured by one of the conventional configurations and is also configured so as to convert a rotational movement of the lower steering shaft 23 into a translational movement of a rod 24 in a right-left direction of a vehicle body, and so as to generate an assisting force for driving the rod 24 in a direction of assisting a rotational torque, received from the lower steering shaft 23, by means of an electric motor (not shown). Hence, when the steering wheel 21 is rotatably operated by the driver, the front-wheels FL and FR are rotatably steered while a steering torque generated by the operation of the driver is assisted by the assisting force.

The STRf is configured with a motor MTf and a gear mechanism (not shown) so that a ratio of a rotational angle of the steering wheel 21 relative to the steering angle of the front-wheels FL and FR (i.e. steering gear ratio) is changeable by controlling a rotational angle of the motor MTf (corresponding to a wheel steering angle equivalent value). The rotational angle of the motor MTf is equivalent to the steering angle of the front-wheels FL and FR. Therefore, hereinafter, the rotational angle of the motor MTf may also be expressed as the steering angle of the front-wheels for convenience.

The hydraulic unit (HU) 40 has a known configuration including a plural electromagnetic valve, a hydraulic pump, a motor and the like. The HU 40 supplies a brake hydraulic pressure corresponding to an operation of a brake pedal BP to a wheel cylinder W of each wheel when a brake control is not executed. Further, the HU 40 is configured to adjust the brake hydraulic pressure within the wheel cylinder W of each individual wheel independently from the operation of the brake pedal BP when the brake control is executed.

Symbols '' are used to comprehensively indicate wheels, specifically, 'fl' indicates a front-left wheel, 'fr' indicates a front-right wheel, 'rl' indicates a rear-left wheel and 'rr' indicates a rear-right wheel. Hence, for example, the wheel cylinder W comprehensively indicates a front-left wheel cylinder Wfl, a front-right wheel cylinder Wfr, a rear-left wheel cylinder Wrl and a rear-right wheel cylinder Wrr.

The steering control device includes a wheel speed sensor 51 for detecting a wheel speed Vw, a steering wheel rotational angle sensor 52 for detecting the rotational angle of the steering wheel 21 (i.e. a steering wheel angle θsw), for example, from a neutral position, a steering torque sensor 53 for detecting a steering torque Tsw generated by the driver operating the steering wheel 21, a yaw rate sensor 54 (an actual motion property (actual yaw rate) detection means) for detecting a yaw rate Yr of the vehicle body, a longitudinal acceleration sensor 55 (a friction coefficient obtaining means) for detecting a longitudinal acceleration Gx generated in a front-rear direction (a longitudinal direction) of the vehicle body, a lateral acceleration sensor 56 (the friction coefficient obtaining means) for detecting a lateral acceleration Gy generated in the right-left direction (a lateral direction) of the vehicle body, a rotational angle sensor 57 for detecting the rotational angle of the motor MTf (an actual steering angle θact, which corresponds to an actual value of the wheel steering angle equivalent value), a wheel cylinder pressure sensor 58\*\* (a longitudinal force obtaining means) for detecting a wheel cylinder pressure Pw\*\*, and an electronic control unit (ECU) 60.

The ECU 60 is a microcomputer that is configured by a plural ECUs (ECUs 0, 1, 2, 3 and 4) connected to each other by a communication bus CB. The ECU 60 is electrically connected to the HU 40 and the sensors 51, 52, 53, 54, 55, 56, 57 and 58. Each of the ECUs 0, 1, 2, 3 and 4 within the ECU 60 is configured to execute an individual and separate control from each other.

More specifically, the ECU 0 (slip restraining means) is configured to execute the known slip restraining control (longitudinal force control) such as an anti-skid control (ABS control) and a traction control (TCS control) and the like, on the basis of signals from the wheel speed sensor 51\*\*, the lateral acceleration sensor 55 and the like. The ECU 1 is configured to execute a front-wheel steering control, which will be described below, on the basis of signals from the steering wheel rotational angle sensor 52, the wheel speed sensor 51\*\* and the like. The ECU 2 is configured to execute the known electric power steering control on the basis of a signal from the steering torque sensor 53. The ECU 3 and the ECU 4 are configured to execute controls on powertrains such as an automatic transmission, an engine and the like (both of which are not shown in FIG. 1).

[Front-Wheel Steeling Control]

Figure 2:
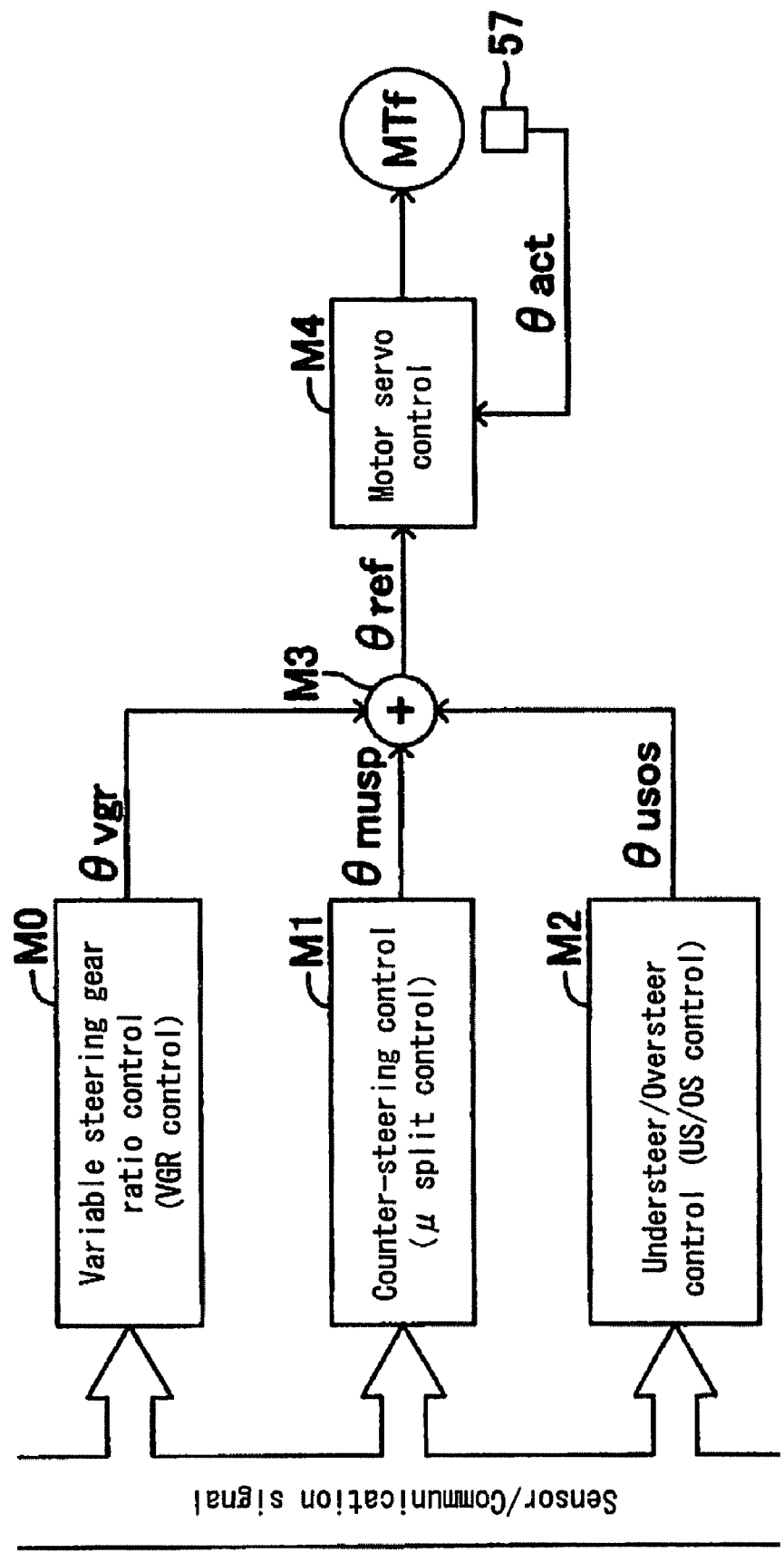
FIG. 2 broadly illustrates a functional block diagram of a front-wheel steering control executed by the steering control device illustrated in FIG. 1.

The front-wheel steering control executed by the steering control device, more specifically by the ECU 1, will be described below in accordance with FIG. 2. FIG. 2 is a functional block diagram schematically illustrating the front-wheel steering control. As illustrated in FIG. 2, the steering control device includes functional blocks M0, M1, M2, M3 and M4, and the motor MTf.

In the variable steering gear ratio control portion M0 (hereinafter referred to as a VGR control portion M0), which will be described in detail below, a reference angle (a reference steering angle θvgr) of the motor MTf is calculated on the basis of output signals of the sensors and communication signals. The reference angle θvgr corresponds to a reference value of the wheel steering angle equivalent value. Further, the VGR control portion M0 corresponds to a reference value determination means.

In the counter-steering control portion M1, which will be described in detail below, an adjustment angle of the motor MTf based on a counter-steering control (an adjustment steering angle θmusp based on the counter-steering control) is calculated on the basis of the output signals of the sensors and the communication signals. The counter-steering control refers to a steering control for reducing a moment that is generated due to a difference between a longitudinal force of right-wheels (right-wheel longitudinal force) and a longitudinal force of left wheels (left-wheel longitudinal force) and that deflects the vehicle. The adjustment steering angle θmusp based on the counter-steering control corresponds to a sum of a first adjustment value of the wheel steering angle equivalent value and a second adjustment value of the wheel steering angle equivalent value.

In the understeer/oversteer control portion M2 (which is hereinafter referred to as a US/OS control portion M2 and which corresponds to a third adjustment value determination means), which will be described in detail below, a adjustment angle of the motor MTf based on the US/OS control (an adjustment steering angle θusos based on the US/OS control) is calculated on the basis of the output signals of the sensors and the communication signals. The US/OS control refers to a steering control for restricting an understeer or an oversteer of the vehicle. The adjustment steering angle θusos based on the US/OS control corresponds to a third adjustment value of the wheel steering angle equivalent value.

In the target steering angle calculation portion M3, a target steering angle θref is calculated by adding the adjustment steering angle θmusp based on the counter-steering control and the adjustment steering angle θusos based on the US/OS control to the reference steering angle θvgr. The target steering angle calculation portion M3 corresponds to a target value determination means.

In the motor servo control portion M4, the rotational angle of the motor MTf is servo-controlled so that the actual steering angle θact obtained from the rotational angle sensor 57 corresponds to the target steering angle θref. As a result, the front-wheel steering angle is controlled to a value that is obtained by applying adjustments based on the counter-steering control and the US/OS control relative to the steering angle based on the VGR control. The motor servo control portion M4 corresponds to a steering angle control means. The control portions M0, M1, M2, M3 and M4 will be described in detail hereinbelow.

<VGR Control Portion M0>

Figure 3:
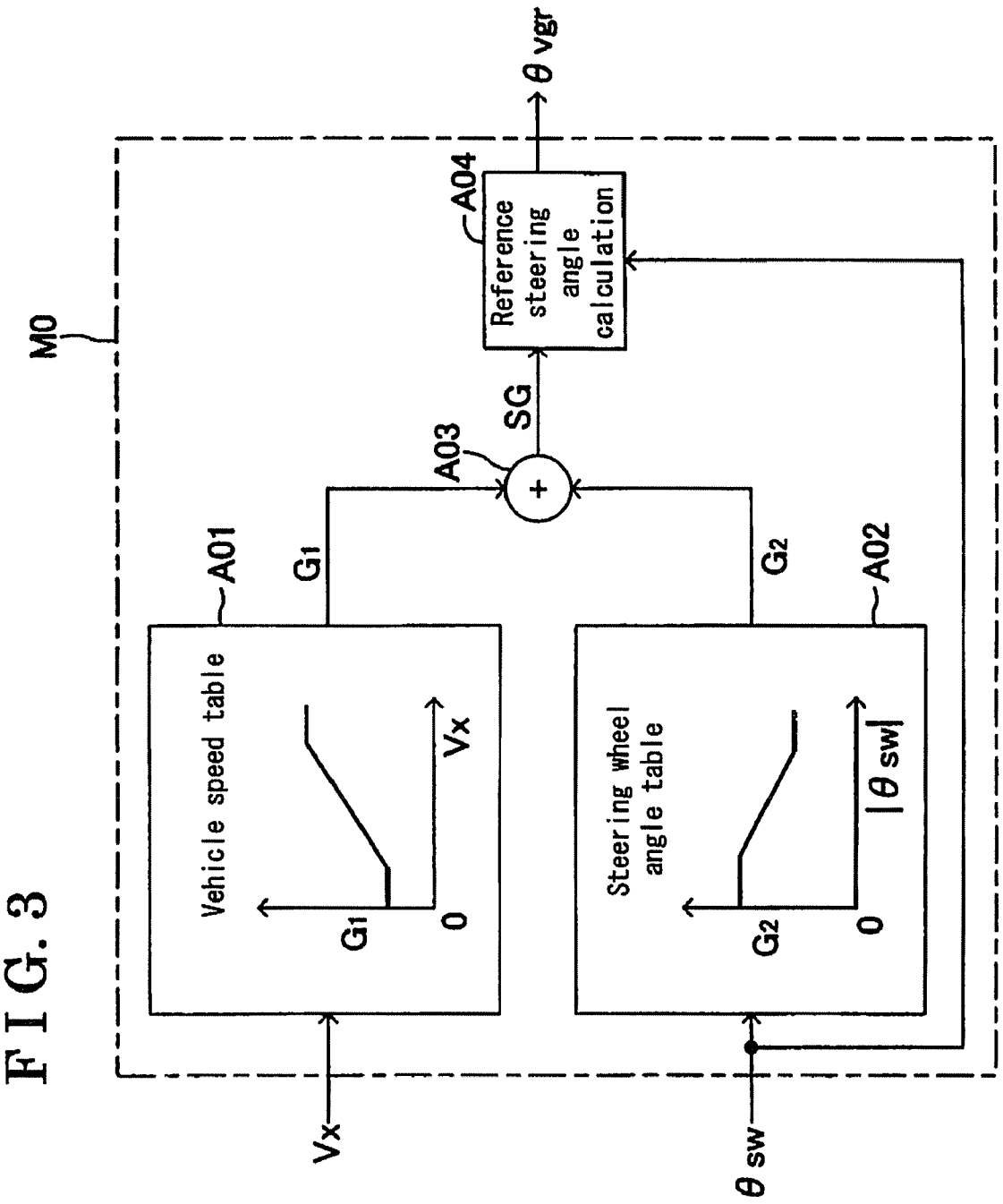
FIG. 3 illustrates a functional block diagram of a VGR control portion illustrated in FIG. 2.

As illustrated in FIG. 3, the VGR control portion M0 is configured with functional blocks A01, A02, A03 and A04.

In the first steering gear ratio calculation portion A01, a first steering gear ratio G1 is determined on the basis of a vehicle body speed Vx, which is calculated on the basis of the wheel speed Vw\*\* obtained from the wheel speed sensor 51\*\*, and a table illustrated in FIG. 3. The steering gear ratio refers to the ratio of the rotational angle of the steering wheel 21 relative to the front-wheel steering angle.

In the second steering gear ratio calculation portion A02, a second steering gear ratio G2 is determined on the basis of the rotational angle θsw of the steering wheel 21 obtained from the steering wheel rotational angle sensor 52, and a table illustrated in FIG. 3.

In the third steering gear ratio calculation portion A03, a steering gear ratio SG is calculated to be a value equivalent to a sum of the first and second steering gear ratios G1 and G2 (i.e. SG=G1+G2). As a result, the steering gear ratio SG is calculated on the basis of the vehicle body speed Vx and the rotational angle θsw of the steering wheel 21. Hence, the greater the vehicle body speed Vx is, the greater value the steering gear ratio SG is determined to be, and the smaller the rotational angle θsw (or, a absolute value of the rotational angle θsw) is, the greater value the steering gear ratio SG is determined to be (see FIG. 3).

In the reference steering angle calculation portion A04, the reference steering angle θvgr, which is the rotational angle (the reference angle) of the motor MTf necessary for achieving the steering gear ratio SG, is determined on the basis of the steering gear ratio SG and the rotational angle θsw of the steering wheel 21 (see FIG. 2).

<Counter-Steering Control Portion M1>

Figure 4:
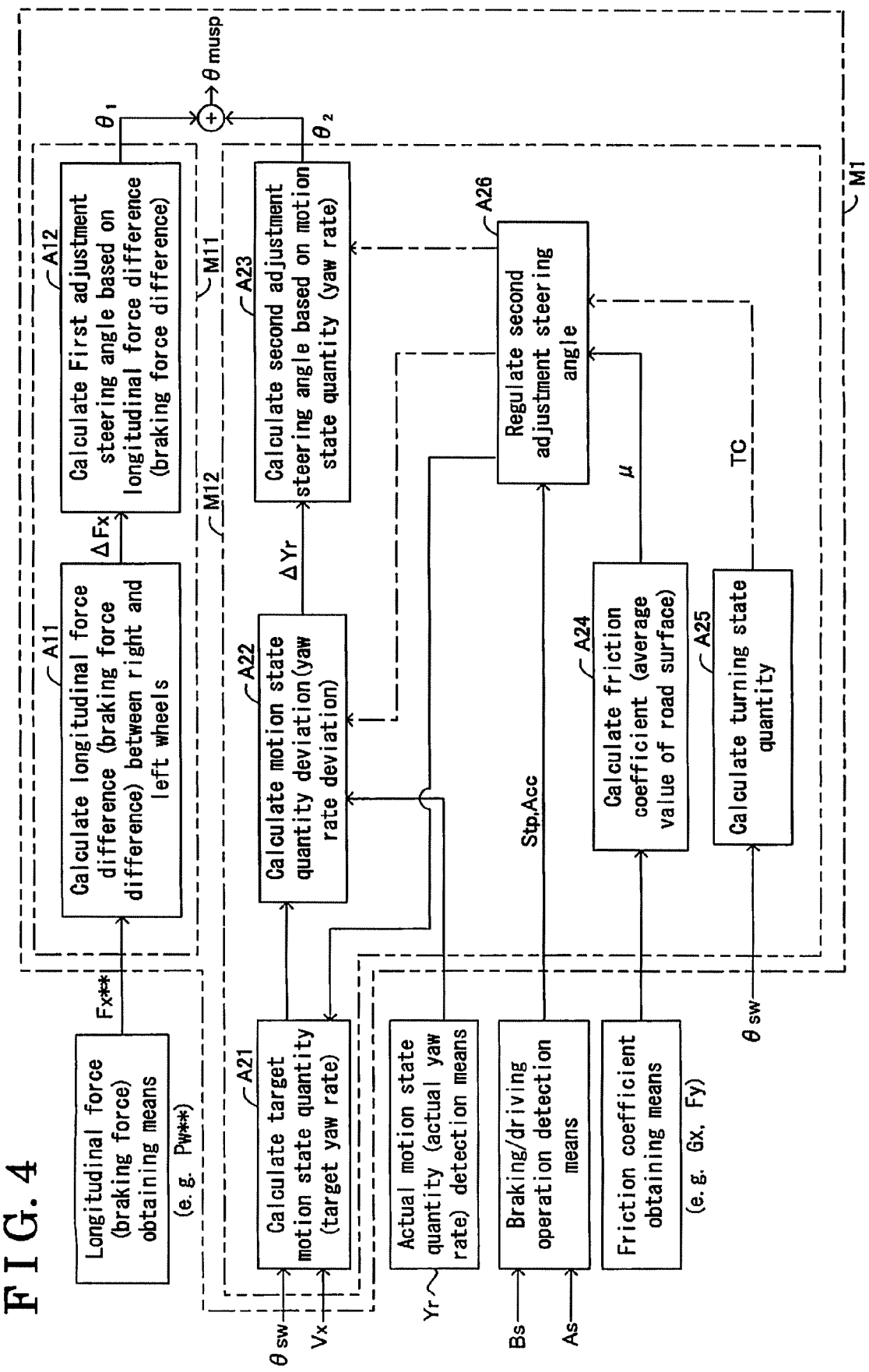
FIG. 4 illustrates a functional block diagram of a counter-steering control portion illustrated in FIG. 2.

As illustrated in FIG. 4, the counter-steering control portion M1 is configured by a feed-forward control portion M11 using the front-wheel adjustment steering angle based on the difference between the right-wheel longitudinal force and the left-wheel longitudinal force and a feedback control portion M12 using the front-wheel adjustment steering angle based on a deviation in a motion state quantity (a deviation).

<<Feed-Forward Control Portion M11>>

The feed-forward control portion M11 is configured by functional blocks A11 and A12.

In the longitudinal force difference calculation portion A11 for calculating the longitudinal force difference between the right-wheels and left-wheels, a longitudinal force difference between the right and left wheels ΔFX (hereinafter referred to as a longitudinal force difference ΔFX) is calculated on the basis of the longitudinal force FX of the wheel  by using the following equation (equation 1).

$$\Delta FX = (FXfr + FXrr) - (FXfl + FXrl) \quad \text{Equation 1:}$$

The longitudinal force FX of the wheel  is calculated by using, for example, the wheel cylinder pressure Pw obtained from the wheel cylinder pressure sensor 58, the wheel speed Vw and the like, and by using one of the known methods. Alternatively, the longitudinal force FX may be calculated on the basis of a braking torque of the wheel  obtained from the wheel cylinder pressure Pw, a driving torque of the wheel  obtained from a driving torque of the engine, an angular acceleration of the wheel  obtained as a differential value of the wheel speed Vw, an equation of rotational movement of the wheel , and the like. Additionally, the wheel cylinder pressure sensor 58 may be omitted. In a case where the wheel cylinder pressure sensor 58 is omitted, the longitudinal force FX** may be estimated on the basis of an operating state of the hydraulic pump, the motor, the electromagnetic valves and the like, which configure the HU 40.

Figure 5:
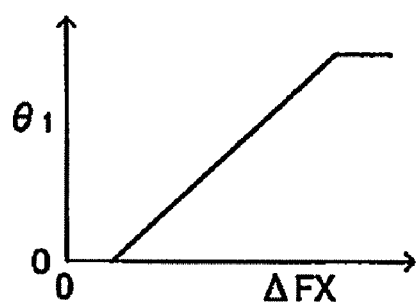
FIG. 5 is a graph showing a table specifying a relationship between a first adjustment steering angle and a longitudinal force difference between right and left wheels.

In the first adjustment steering angle calculation portion A12, an adjustment angle of the motor MTf based on the longitudinal force difference between the right and left wheels (a first adjustment steering angle $\theta_1$ of the front-wheels) is determined on the basis of the longitudinal force difference ΔFX and a table illustrated in FIG. 5. As a result, the first adjustment steering angle $\theta_1$ is determined to be a value by which the first adjustment steering angle $\theta_1$ is directed to restrain the vehicle deflection occurring due to a longitudinal force difference attributing yaw moment. More specifically, the greater the longitudinal force difference ΔFX is, the greater value the first adjustment steering angle $\theta_1$ is set at. The first adjustment steering angle $\theta_1$ corresponds to a second adjustment value of the wheel steering angle equivalent value. Further, the feed-forward control portion M11 corresponds to a second adjustment value determination means.

<<Feedback Control Portion M12>>

The feedback control portion M12 is configured by functional blocks A21, A22, A23, A24, A25 and A26. In the target motion state quantity calculation portion A21, a target motion state quantity, for example a target yaw rate, is calculated from various sensor outputs. In the motion state quantity deviation calculation portion A22, a motion state quantity deviation ΔYr, for example a yaw rate deviation, is calculated from the target motion state quantity and an actual motion state quantity, for example an actual yaw rate, obtained from the sensor output. In the second adjustment steering angle calculation portion A23, an adjustment angle of the motor MTf based on the motion state quantity (i.e. a second adjustment steering angle $\theta_2$ of the front-wheels) is determined on the basis of the motion state quantity deviation ΔYr.

As a result, the second adjustment steering angle $\theta_2$ is determined to be a value by which the second adjustment steering angle $\theta_2$ is directed to approximate the motion state quantity deviation to zero. The second adjustment steering angle $\theta_2$ corresponds to a first adjustment value of the wheel steering angle equivalent value. Further, the feedback control portion M12 corresponds to a first adjustment value determination means. The counter-steering control portion M1 determines the adjustment steering angle θmusp, which is the adjustment angle of the motor MTf based on the counter-steering control (see FIG. 2), by adding the first adjustment steering angle $\theta_1$ and the second adjustment steering angle $\theta_2$.

The feedback control portion M12 further includes the friction coefficient calculation portion A24 for calculating an average friction coefficient μ of the road surface (hereinafter referred simply as a friction coefficient μ of the road surface) from the various sensor outputs, the turning state quantity calculation portion A25 for calculating a turning state quantity TC from the various sensor outputs, and the second adjustment steering angle regulating portion A26 for regulating the second adjustment steering angle $\theta_2$ on the basis of the calculation results of the friction coefficient calculation portion A24, the turning state quantity calculation portion A25 and the like. The friction coefficient calculation portion A24 and the turning state quantity calculation portion A25 serve as an index value obtaining means. The second adjustment steering angle regulation portion A26 corresponds to a regulation means. Other embodiments of the feedback control portion M12 will be described further in detail below.

Figure 6:
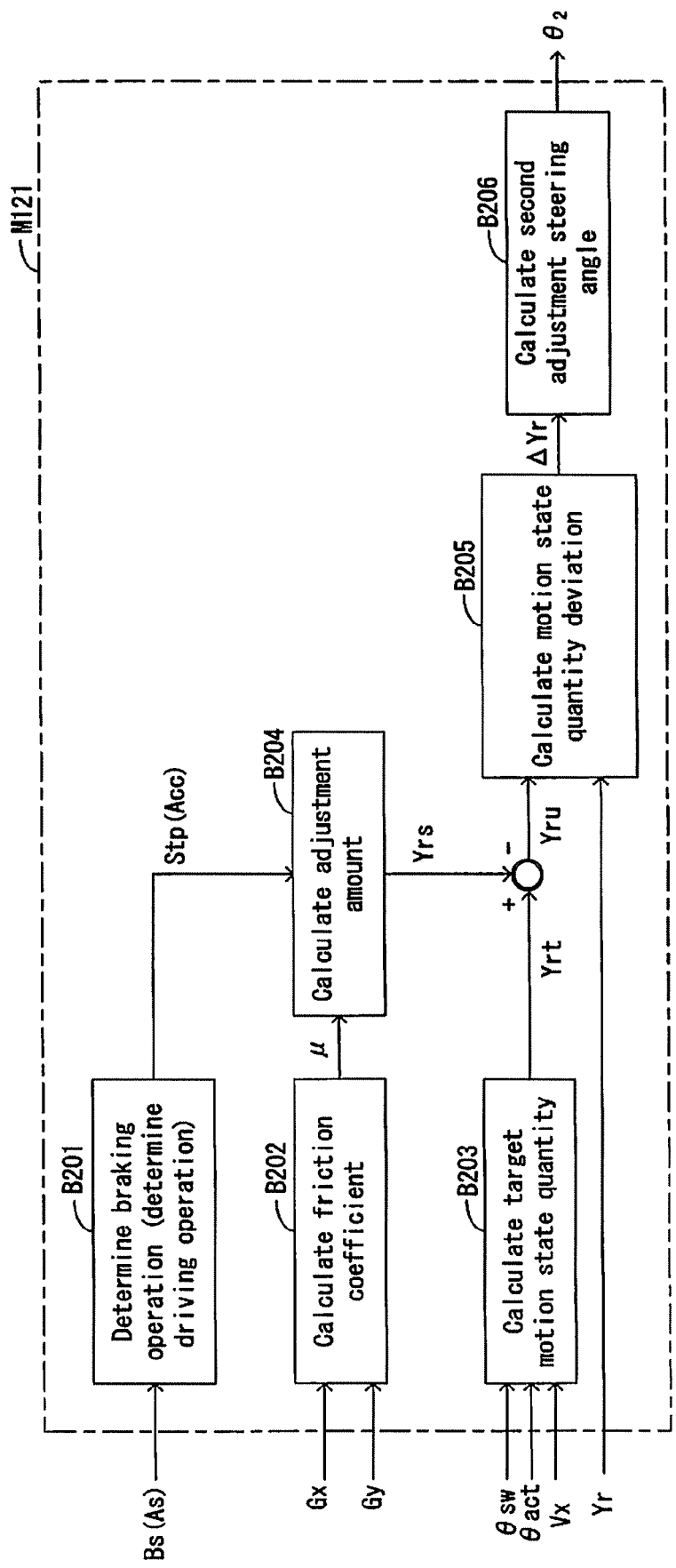
FIG. 6 illustrates a functional block diagram of a first embodiment of the counter-steering control portion illustrated in FIG. 2.

FIG. 6 illustrates a first embodiment M121 of the feedback control portion M12. In this first embodiment M121, the feedback control portion M12 is configured by functional blocks B201, B202, B203, B204, B205 and B206.

The brake (drive) operation determination means B201 determines whether or not the brake (drive) operation is performed by the driver on the basis of a signal of a brake switch Bs (an acceleration switch As) (now shown) that is linked to a brake pedal BP (an acceleration pedal AP) (i.e. brake/drive operation detection means). A Stp signal (an Acc signal) is generated only in a case where the brake (drive) operation determination means B201 determines that brake (drive) operation is performed.

In the friction coefficient calculation portion B 202 (which corresponds to the block A24 in FIG. 4), the average friction coefficient μ of the road surface on which the vehicle travels is calculated. For example, the average friction coefficient μ is set to a maximum value of a formula: $\sqrt{(Gx^2 + Gy^2)}$ (i.e., a maximum value within a predetermined time) on the basis of the longitudinal acceleration Gx and the lateral acceleration Gy. Alternatively, the average friction coefficient μ may be calculated by known methods, for example, by a method of calculating the friction coefficient μ from the brake hydraulic pressure at a starting time of the ABS control.

In the target motion state quantity calculation portion B203 (which corresponds to the block A21 in FIG. 4), a target motion state quantity Yrt, for example the target yaw rate, is calculated on the basis of at least the steering wheel angle θsw and the vehicle body speed Vx.

Figure 7:
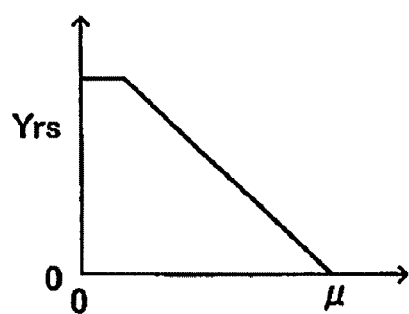
FIG. 7 is a graph showing a table specifying a relationship between a friction coefficient of a road surface and an adjustment amount of a target motion state quantity.

In the adjustment amount calculation portion B204 (which corresponds to the block A26 in FIG. 4), an adjustment amount Yrs of the target motion state quantity Yrt, for example an adjustment yaw rate, is determined on the basis of the friction coefficient μ and a table illustrated in FIG. 7. Therefore, as illustrated in the table of FIG. 7, the smaller the friction coefficient μ becomes, the greater value the adjustment amount Yrs is determined to be, under a condition that the adjustment amount Yrs does not exceed the target motion state quantity Yrt. Additionally, in a case where the Stp signal (the Acc signal) is not generated, the adjustment amount Yrs is set to zero.

An adjusted target motion state quantity Yru is determined by subtracting the adjustment amount Yrs from the target motion state quantity Yrt (i.e. Yru=Yrt−Yrs). Then, the smaller the friction coefficient μ becomes, the smaller value (≧0) the target motion state quantity Yru is adjusted to be, by the adjustment amount Yrs. In the case where the Stp signal (the Acc signal) is not generated, the target motion state quantity Yru is set to a value equal to the target motion state quantity Yrt.

In the motion state quantity deviation calculation portion B205 (which corresponds to the block A22 in FIG. 4), the deviation ΔYr, for example the yaw rate deviation, which is a deviation between the target motion state quantity Yru and an actual motion state quantity Yr (e.g. the actual yaw rate detected by the yaw rate sensor 54), is calculated (i.e. ΔYr=Yru−Yr). As a result, the smaller the friction coefficient μ becomes, the smaller value the motion state quantity deviation ΔYr is adjusted to be, by the adjustment amount Yrs.

Figure 8:
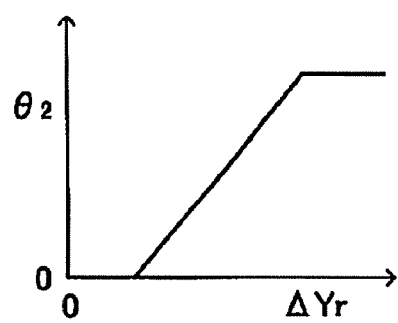
FIG. 8 is a graph showing a table specifying a relationship between a motion state quantity deviation and a second adjustment steering angle.

In the second adjustment steering angle calculation portion B206 (which corresponds to the block A23 in FIG. 4), the second adjustment steering angle $\theta_2$ based on the motion state quantity is determined on the basis of the motion state quantity deviation ΔYr and a table illustrated in FIG. 8. As a result, the second adjustment steering angle $\theta_2$ is determined to be a value by which the second adjustment steering angle $\theta_2$ is directed to approximate the motion state quantity deviation ΔYr to zero and at the same time, the greater the motion state quantity deviation ΔYr becomes, the greater value the second adjustment steering angle $\theta_2$ is determined to be.

Additionally, as the smaller the friction coefficient μ is, the smaller value the motion state quantity deviation ΔYr is adjusted to be, the smaller the friction coefficient μ is, the smaller value the second adjustment steering angle $\theta_2$ is set to be. Accordingly, in the first embodiment M121 of the feedback control portion M12, in the case where the Stp signal (the Acc signal) is generated (i.e. in the case where the brake (acceleration) operation is performed by the driver), the smaller the friction coefficient μ is, the smaller value the target motion state quantity Yrt is adjusted to be, by the adjustment amount Yrs, therefore, the smaller the friction coefficient μ is, the smaller value the second adjustment steering angle $\theta_2$ is determined to be.

The smaller the friction coefficient μ is, the more the understeer (i.e. the side-slip of the wheel) tends to occur. In the case where the understeer occurs at the vehicle, the target motion state quantity Yrt exceeds the actual motion state quantity Yr. Therefore, in order to approximate the motion state quantity deviation ΔYr to zero by increasing the actual motion state quantity Yr, the second adjustment steering angle $\theta_2$ is determined to be the value by which the second adjustment steering angle $\theta_2$ is directed to increase the front-wheel steering angle towards the running inner side. As a result, in the case where the understeer occurs, the smaller the friction coefficient μ is, i.e. the more the side-slip tends to occur at the wheel, the smaller value the second adjustment steering angle $\theta_2$ is determined to be, and at the same time, the second adjustment steering angle $\theta_2$ is determined to be the value by which the front-wheel steering angle is increased towards the turning inner side.

Figure 9:
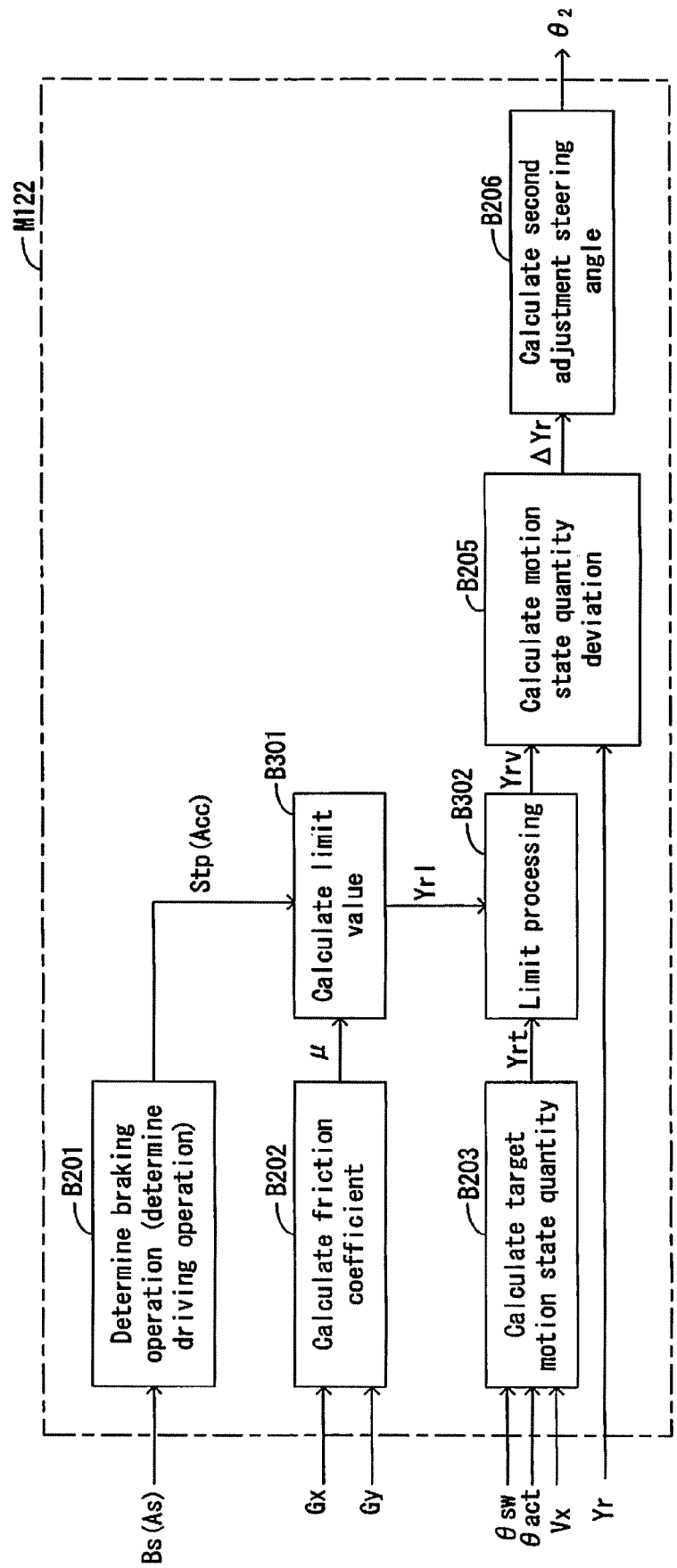
FIG. 9 illustrates a functional block diagram of a second embodiment of the counter-steering control portion illustrated in FIG. 2.

FIG. 9 illustrates a second embodiment M122 of the feedback control portion M12. In the second embodiment M122, the identical reference numerals represent the identical or corresponding functional blocks of the feedback control portion M12 of the first embodiment M121. Therefore, the detailed description on the identical or corresponding functional blocks will be omitted (likewise in a third and fourth embodiments).

The feedback control portion M1 2 of the second embodiment M122 differs from the feedback control portion M12 of the first embodiment M121 in that the adjustment amount calculation portion B204 is replaced by a limit value calculation portion B301 and a limit processing portion B302.

Figure 10:
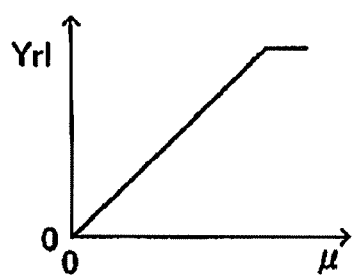
FIG. 10 is a graph showing a table specifying a relationship between the friction coefficient of the road surface and a limit value of the target motion state quantity.

In the limit value calculation portion B301 (which corresponds to the block A26 in FIG. 4), a limit value Yrl (un upper limit) of the target motion state quantity Yrt is determined on the basis of the friction coefficient μ and a table illustrated in FIG. 10. As a result, the smaller the friction coefficient μ is, the smaller value the limit value Yrl is determined to be.

In the limit processing portion B302 (which corresponds to the block A26 in FIG. 4), a limited target motion state quantity Yrv is determined by limiting the target motion state quantity Yrt by the limit value Yrl. In other words, in a case where the target motion state quantity Yrt is equal to or lower than the limit value Yrl, the limited target motion state quantity Yrv is determined to be a value equal to the target motion state quantity Yrt. On the other hand, in a case where the target motion state quantity Yrt exceeds the limit value Yrl, the limited target motion state quantity Yrv is determined to be a value equivalent to the limit value Yrl. As a result, the smaller the friction coefficient μ is, the smaller value (≧0) the limited target motion state quantity Yrv is limited to be. Further, in the case where the Stp signal (the Acc signal) is not generated, the limited target motion state quantity Yrv is set to a value equal to the target motion state quantity Yrt. The limited target motion state quantity Yrv is utilized in the motion state quantity deviation calculation portion B205.

As a result, as is the case with the first embodiment M121, in the case where the Stp signal (the Acc signal) is generated, the smaller friction coefficient μ is, the smaller the value the target motion state quantity Yrt is limited to be, by the limit value Yrl, therefore, the smaller the friction coefficient μ is, the smaller the second adjustment steering angle $\theta_2$ is determined to be. Hence, in the case where the understeer occurs at the vehicle, the smaller the friction coefficient μ is, the smaller value the second adjustment steering angle $\theta_2$ is determined to be, and at the same time, the second adjustment steering angle $\theta_2$ is determined to be the value by which the front-wheel steering angle is increased towards the turning inner side.

Figure 11:
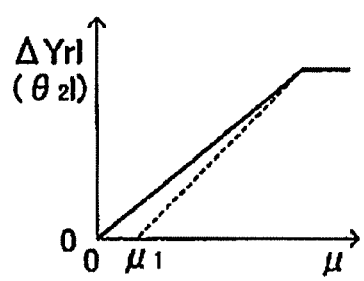
FIG. 11 is a graph showing a table specifying a relationship between the friction coefficient of the road surface and the motion state quantity deviation (a second adjustment steering angle)

In the second embodiment M122, the configuration of the feedback control portion M12 may be modified so that the limit processing portion B302 is inserted between the motion state quantity deviation calculation portion B205 and the second adjustment steering angle calculation portion B206, or so that the limit processing portion B302 is inserted after the second adjustment steering angle calculation portion B206. In the case where the configuration of the feedback control portion M12 is modified as above, a limit value ΔYrl ($\theta_2$l) of the motion state quantity deviation ΔYr is determined on the basis of the friction coefficient μ and a table illustrated in FIG. 11.

As a result, the smaller the friction coefficient μ is, the smaller value the motion state quantity deviation ΔYr (the second adjustment steering angle $\theta_2$) is limited to be. In this case, as illustrated by a dashed line in FIG. 11, the second adjustment steering angle $\theta_2$ may be set to zero by setting the limit ΔYrl ($\theta_2$l) to zero in a case where the friction coefficient μ is lower than a value μ1, which corresponds to a first predetermined value.

Figure 12:
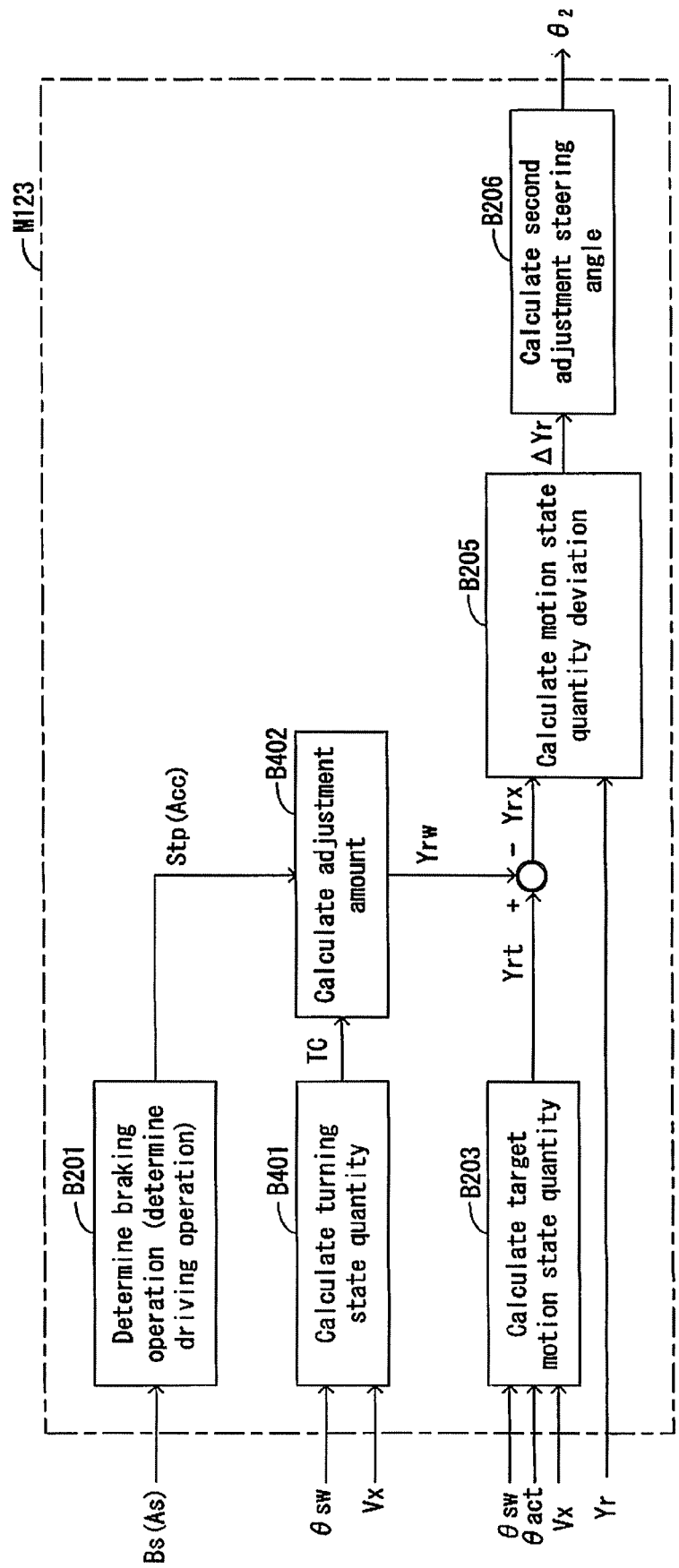
FIG. 12 illustrates a functional block diagram of a third embodiment of the counter-steering control portion illustrated in FIG. 2.

FIG. 12 illustrates the third embodiment M123 of the feedback control portion M12. The feedback control portion M12 of the third embodiment M123 differs from the feedback control portion M12 of the first embodiment M121 in that the friction coefficient calculation portion B202 and the adjustment amount calculation portion B204 are replaced by a turning state quantity calculation portion B401 and an adjustment amount calculation portion B402, respectively.

In the turning state quantity calculation portion B401 (which corresponds to the block A25 in FIG. 4), the turning state quantity TC, indicating a level (i.e. a state quantity) of the turning motion of the vehicle, is calculated on the basis of at least the steering wheel angle θsw. In a case where the turning state quantity TC is calculated in a dimension of the lateral acceleration, the turning state quantity TC is calculated to a value equivalent to a lateral acceleration Gye that is calculated on the basis of the following equation (equation 2).

$$Gye=(\theta sw \cdot Vx^2)/(N \cdot L \cdot (1+Kh \cdot Vx^2))$$  Equation 2:

where Kh indicates a stability factor, L indicates a wheelbase and N indicates the steering gear ratio, which is variable in response to the vehicle speed Vx.

Further, the steering wheel angle θsw, the lateral acceleration Gy or the yaw rate Yr may be determined as the turning state quantity TC. Additionally, the turning state quantity TC being zero (TC=0) indicates that the vehicle travels straight.

Figure 13:
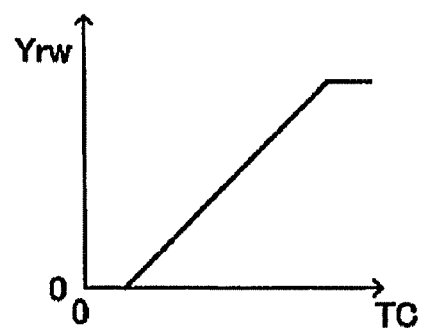
FIG. 13 is a graph showing a table specifying a relationship between a turning state quantity and the adjustment amount of the target motion state quantity.

In the adjustment amount calculation portion B402 (which corresponds to the block A26 in FIG. 4), an adjustment amount Yrw of the target motion state quantity Yrt is determined on the basis of the turning state quantity TC and a table illustrated in FIG. 13. As a result, the greater the turning state quantity TC is, the greater value the adjustment amount Yrw is determined to be, under a condition that the adjustment amount Yrw does not exceed the target motion state quantity Yrt. Further, in the case where the Stp signal (the Acc signal) is not generated, the adjustment amount Yrw is set to zero. An adjusted target motion state quantity Yrx is determined by subtracting the adjustment amount Yrw from the target motion state quantity Yrt (i.e. Yrx=Yrt−Yrw). The adjusted target motion state quantity Yrx is utilized at the motion state quantity deviation calculation portion B205.

As a result, in the third embodiment M1 23, in the case where the Stp signal (the Acc signal) is generated, the greater the turning state quantity TC is, the smaller value the turning motion state quantity Yrt is adjusted to be, by the adjustment amount Yrw. As a result, the greater the turning state quantity TC is, the smaller value the second adjustment steering angle θ₂ is determined to be. The greater the turning state quantity TC is, the more the understeer tends to occur at the vehicle. Therefore, in the case where the understeer occurs, the greater the turning state quantity TC is, i.e. the more the understeer tends to occur, the smaller value the second adjustment steering angle θ₂ is determined to be, and at the same time, the second adjustment steering angle θ₂ is determined to be the value directing to increase the front-wheel steering angle towards the turning inner side.

Figure 14:
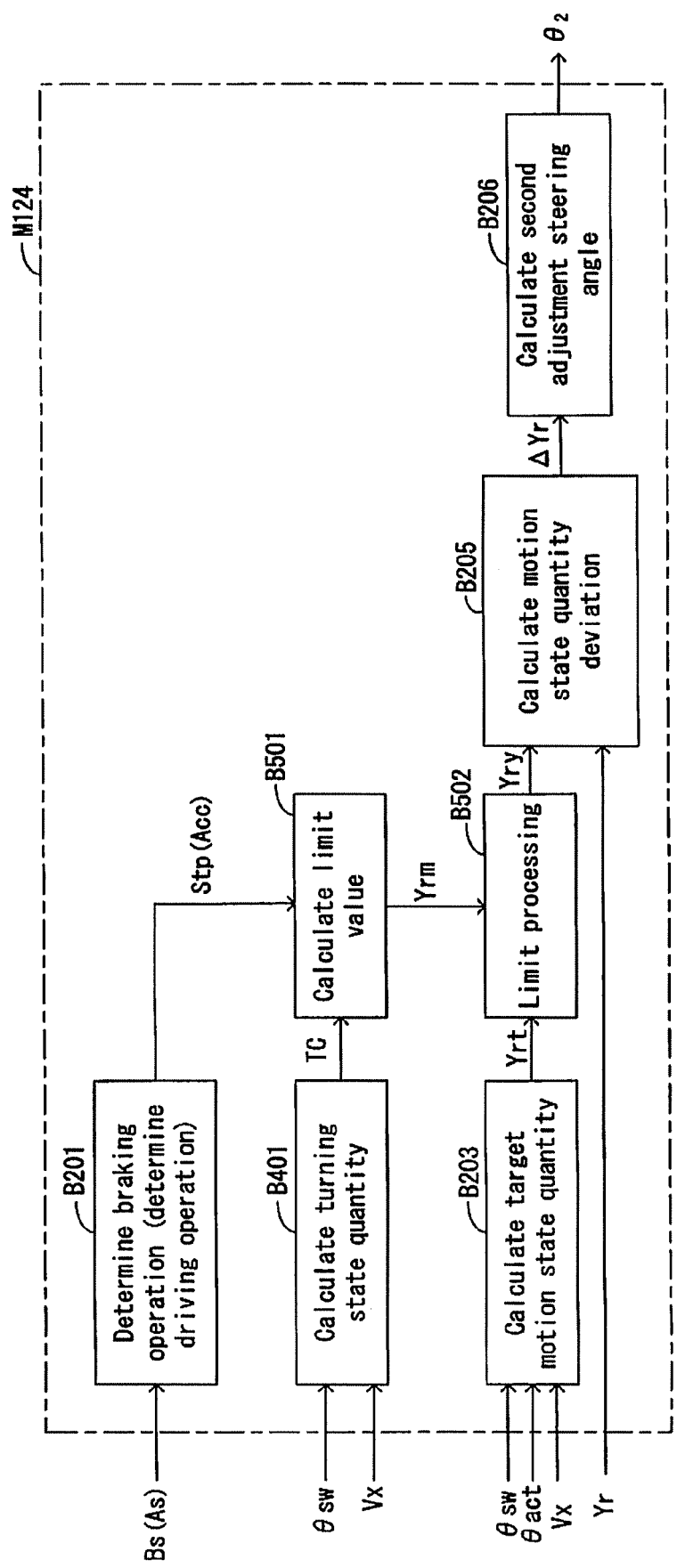
FIG. 14 illustrates a functional block diagram of a fourth embodiment of the counter-steering control portion illustrated in FIG. 2.

FIG. 14 illustrates the fourth embodiment M124 of the feedback control portion M12. The feedback control portion M12 of the fourth embodiment M124 differs from the feedback control portion M12 of the third embodiment M123 in that the adjustment amount calculation portion B402 is replaced by a limit value calculation portion B501 and a limit processing portion B502.

Figure 15:
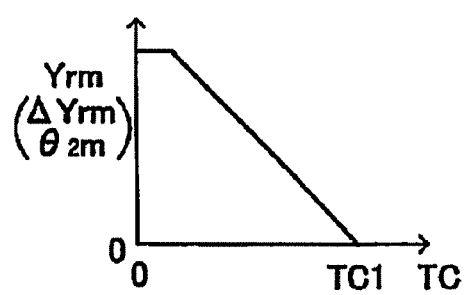
FIG. 15 is a graph showing a table specifying a relationship between the turning state quantity and the limit value of the target motion state quantity (the motion state quantity deviation, the second adjustment steering angle)

In the limit value calculation portion B501 (which corresponds to the block A26 in FIG. 4), a limit value Yrm (an upper limit value) of the target motion state quantity Yrt is determined on the basis of the turning state quantity TC and a table illustrated in FIG. 15. As a result, the greater the turning state quantity TC is, the smaller value the limit value Yrm is determined to be. In a case where the turning state quantity TC exceeds a value TC1, which corresponds to a second predetermined value, the limit value Yrm is set to zero.

As is the case with the limit processing portion B302 (see FIG. 9), in the limit processing portion B502 (which corresponds to the block A26 in FIG. 4), a limited target motion state quantity Yry is determined by limiting the target motion state quantity Yrt by the limit value Yrm. More specifically, in a case where the target motion state quantity Yrt is equal to or lower than the limit value Yrm, the limited target motion state quantity Yry is set to a value equal to the target motion state quantity Yrt. On the other hand, in a case where the target motion state quantity Yrt exceeds the limit value Yrm, the limited target motion state quantity Yry is set to a value equivalent to the limit value Yrm. As a result, the greater the turning state quantity TC is, the smaller value (≧0) the target motion state quantity Yry is limited to be. Additionally, in the case where the Stp signal (the Acc signal) is not generated, the limited target motion state quantity Yry is set to a value equal to the target motion state quantity Yrt. The limited target motion state quantity Yry is utilized at the motion state quantity deviation calculation portion B205.

As a result, as is the case with the third embodiment M123, in the case where the Stp signal (the Acc signal) is generated, the greater the turning state quantity TC is, the smaller value the target motion state quantity Yrt is limited to be by the limit value Yrm, therefore, the greater the turning state quantity TC is, the smaller value the second adjustment steering angle θ₂ is determined to be. Therefore, in the case where the understeer occurs at the vehicle, the greater the turning state quantity TC is, the smaller value the second adjustment steering angle θ₂ is determined to be, and at the same time, the second adjustment steering angle θ₂ is determined to be the value by which the front-wheel steering angle is increased towards the turning inner side.

In the fourth embodiment M1 24, the configuration of the feedback control portion M12 may be modified so that the limit processing portion B502 is inserted between the motion state quantity deviation calculation portion B205 and the second adjustment steering angle calculation portion B206, or so that the limit processing portion B502 is inserted after the second adjustment steering angle calculation portion B206. In the case where the configuration of the feedback control portion M12 of the fourth embodiment M124 is modified as above, a limit value ΔYrm (θ₂m) of the motion state quantity deviation ΔYr (the second adjustment steering angle θ₂) is determined on the basis of the table illustrated in FIG. 15 and replaces the limit value Yrm.

As a result, the greater the turning state quantity TC is, the smaller value the motion state quantity deviation ΔYr (the second adjustment steering angle θ₂) is limited to be. In the case where the turning state quantity TC exceeds the value TC1, the limit value ΔYrm (θ₂m) is set to zero, as a result, the second adjustment steering angle θ₂ is set to zero.

Alternatively, the feedback control portion M12 may be modified so as not to execute the above-described limit process when the turning state quantity TC is zero, i.e. when the vehicle travels straight, and so as to fix the limit value ΔYrm (θ₂m) to zero in order to fix the second adjustment steering angle θ₂ to zero when the turning state quantity TC exceeds zero, i.e. when the vehicle turns. The above-described is the feedback control portion M12 of the counter-steering control portion M1.

<US/OS Control Portion M2>

Figure 16:
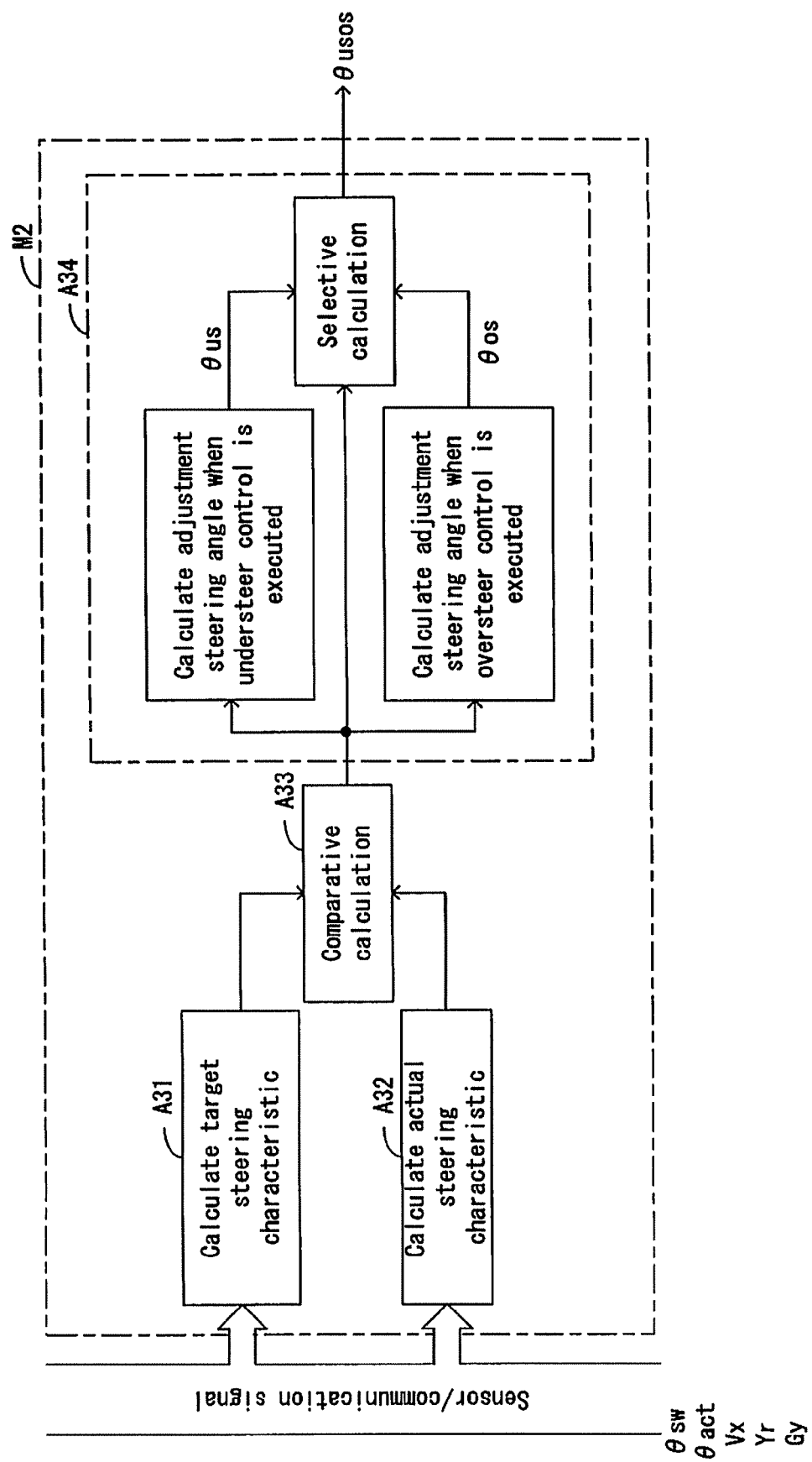
FIG. 16 illustrates a functional block diagram of an understeer/oversteer control portion illustrated in FIG. 2.

As illustrated in FIG. 16, the US/OS control portion M2 is configured by functional blocks A31, A32, A33 and A34. The US/OS control portion M2 calculates the adjustment angle of the motor MTf based on the US/OS control (the adjustment steering angle θusos based on the US/OS control, see FIG. 2).

In the target steering characteristic calculation portion A3 1, a target steering characteristic is calculated on the basis of at least the steering wheel angle θsw. The steering characteristic is determined, for example, by using at least one of a yaw rate characteristic, a characteristic of a side-slip angle of the vehicle body, and a characteristic of side-slip angular speed of the vehicle body.

In the actual steering characteristic calculation portion A32, an actual steering characteristic is calculated on the basis of the output signals from various sensors and the communication signals.

In the comparative calculation A33, the target steering characteristic and the actual steering characteristic are compared in order to determine the steering characteristic of the vehicle (i.e. whether the understeer or the oversteer occurs at the vehicle).

Figure 17:
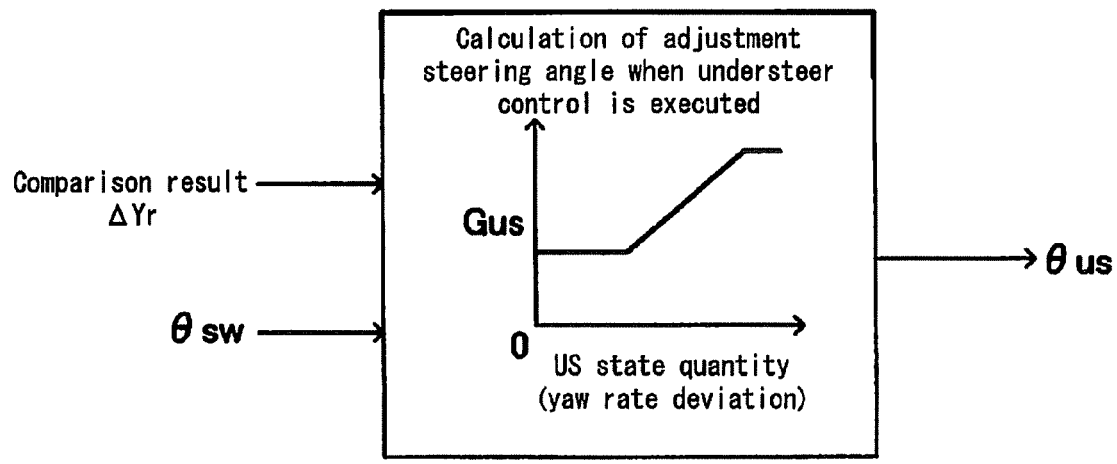
FIG. 17 is a diagram illustrating an example of setting a steering gear ratio when the understeer occurs.

In the adjustment steering angle calculation portion A34, the adjustment steering angle θusos based on the US/OS control is calculated. The case of the understeer will be described below. In this case, an adjustment steering angle θus of when an understeer control is executed is determined to be a value directing to return the front-wheel steering angle to the neutral position (zero) on the basis of the comparison result. Further, as illustrated in FIG. 17, in a case where an understeer state quantity (e.g. the yaw rate deviation) is greater because a level of the understeer is greater, the steering gear ratio (Gus) may be set to be greater. By using the Gus as the steering gear ratio, in the case where the understeer occurs at the vehicle, although a deviation direction of the steering wheel angle from the neutral position corresponds to a deviation direction of the front-wheel steering angle from the neutral position, the front-wheel steering angle relative to the steering wheel angle becomes small. As a result, the front-wheels are less likely to be easily steered.

On the other hand, in a case of calculating the adjustment steering angle θusos while the understeer occurs at the vehicle, an adjustment steering angle θos of when an oversteer control is executed is determined to be a value directing to return the front-wheel steering angle to the neutral position (zero) on the basis of the comparison result.

In the adjustment steering angle calculation portion A34, either the adjustment steering angle θus or the adjustment steering angle θos is selectively outputted as the adjustment steering angle θusos based on the US/OS control depending on the vehicle driving condition. More specifically, when the understeer occurs at the vehicle, the adjustment steering angle θus is outputted as the adjustment steering angle θusos based on the US/OS control, and when the oversteer occurs at the vehicle, the adjustment steering angle θos is outputted as the adjustment steering angle θusos based on the US/OS control.

Figure 18:
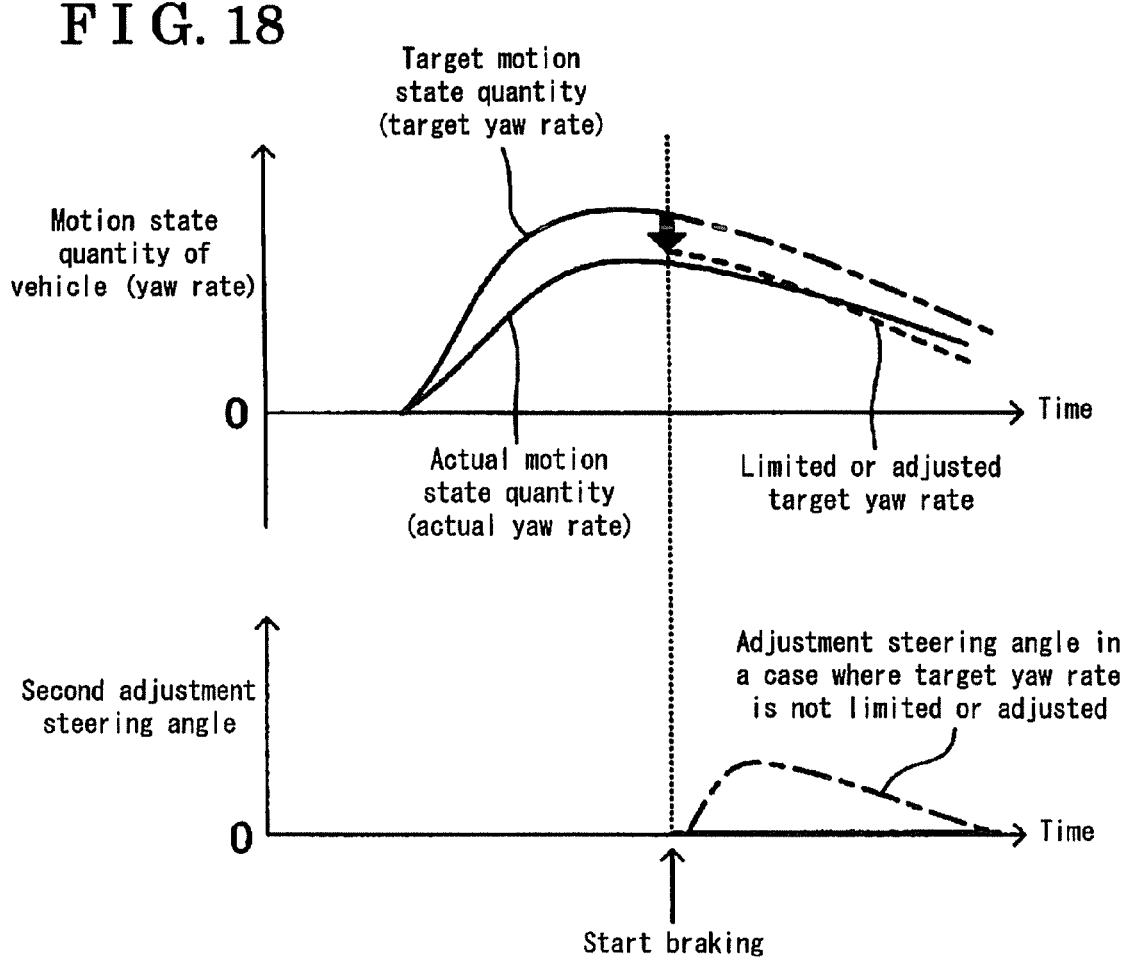
FIG. 18 is a diagram for explaining effects and advantages of the steering control device according to the embodiment.
Figure 19:
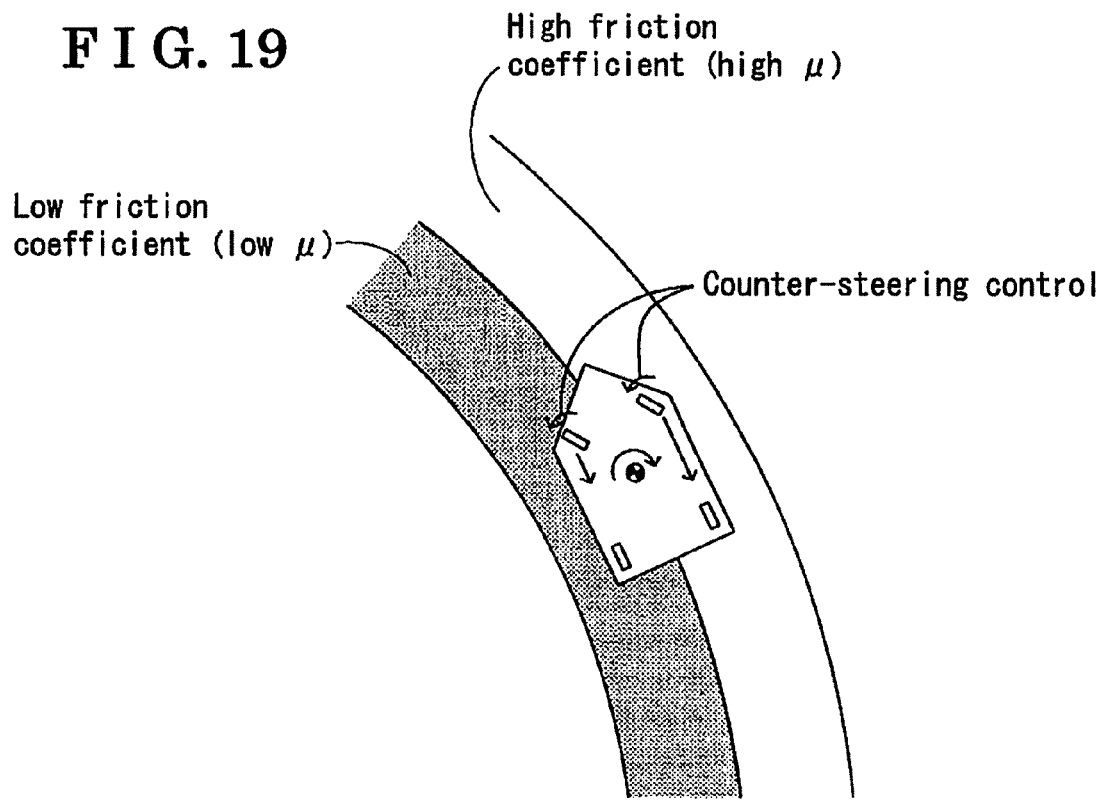
FIG. 19 is a diagram showing a case where a μ split control is started by the brake operation and the case where a counter-steering control is executed to the front-wheels while a vehicle travels on a μ split road surface.
Figure 20:
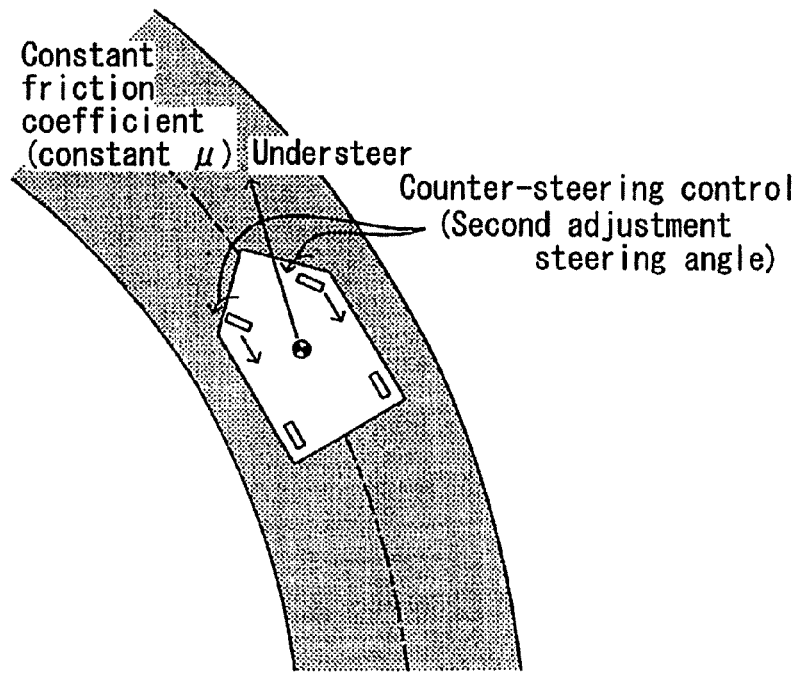
FIG. 20 is a diagram showing a case where the μ split control is started by the brake operation and the case where the counter-steering control is executed to the front-wheels while the vehicle travels on a road surface having a constant friction coefficient, specifically a road surface having a low and constant μ.
Figure 21:
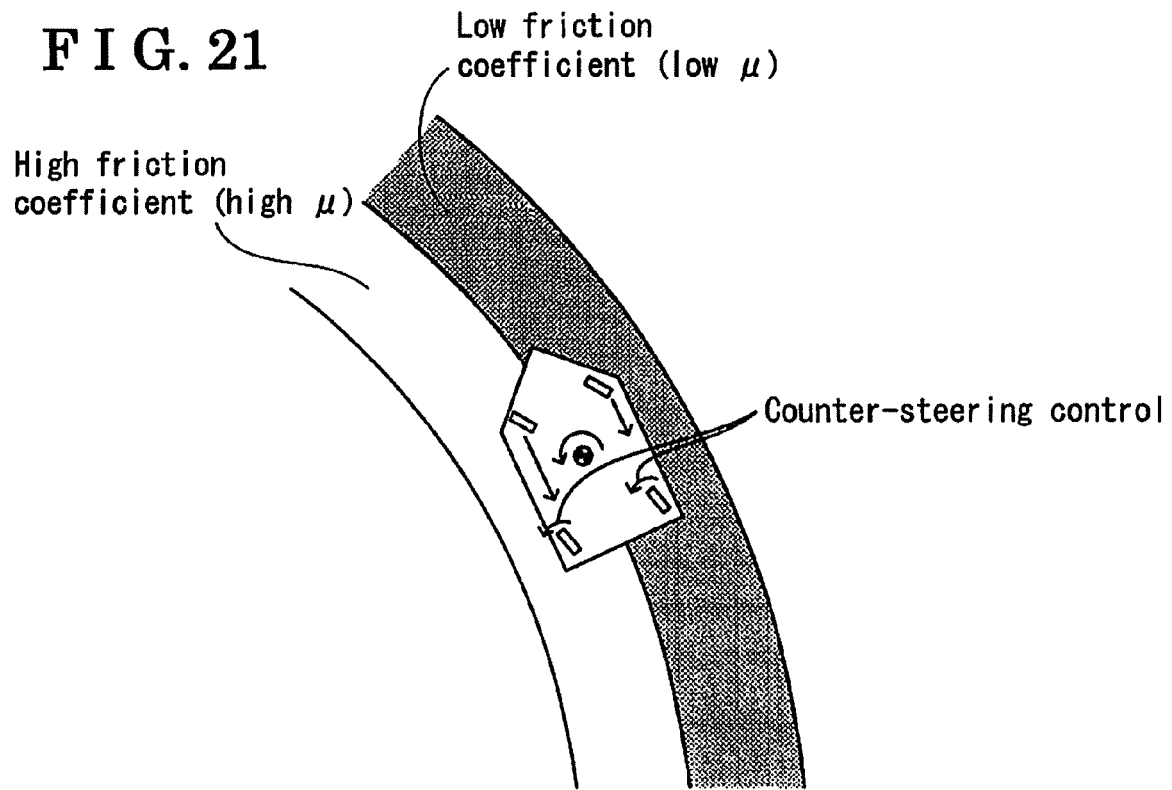
FIG. 21 is a diagram illustrating a case where the μ split control is started by the brake operation and the case where the counter-steering control is executed to the rear-wheels while the vehicle travels on the μ split road surface.
Figure 22:
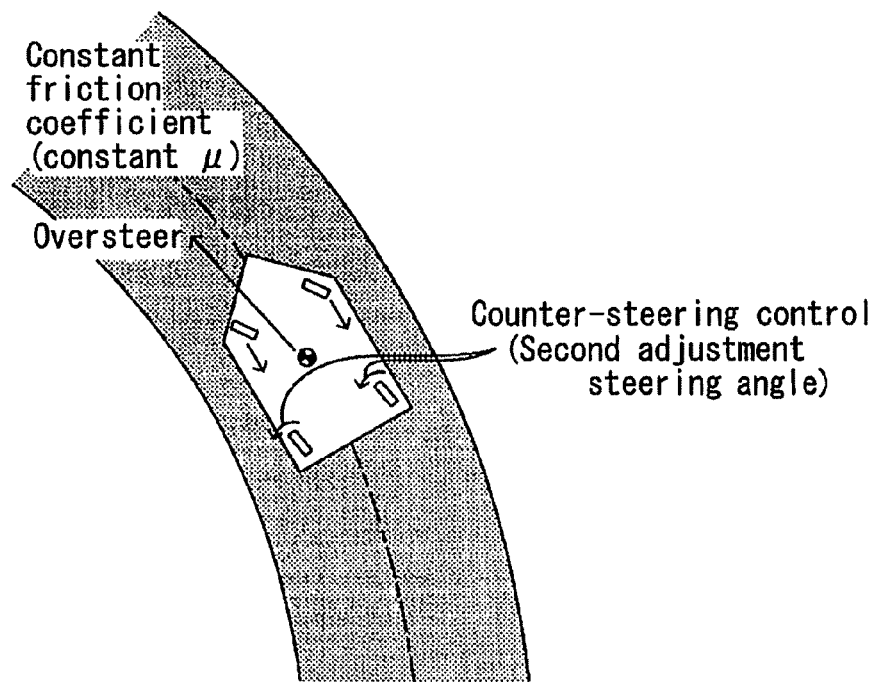
FIG. 22 is a diagram illustrating a case where the μ split control is started by the brake operation and the case where the counter-steering control is executed to rear-wheels while the vehicle travels on the road surface having the constant friction coefficient, specifically the road surface having the low and constant μ.

Effects and advantages of the steering control device having the above-described configurations will be described below in accordance with FIG. 18. FIG. 18 illustrates a case where the brake operation is performed while the vehicle turns the road surface having the low and constant μ at a condition where the turning state quantity TC exceeds zero, and as a result, the understeer occurs at the vehicle.

As illustrated in FIG. 18, in the case where the understeer occurs at the vehicle, the actual yaw rate becomes smaller relative to the target yaw rate. As a result, if the target yaw rate is not adjusted/limited by the steering control device of the embodiment, i.e. if the second adjustment steering angle $\theta_2$ is not adjusted/limited, as illustrated by a dashed-dotted line, the second adjustment steering angle $\theta_2$ is determined to be a value directing to increase the front-wheel steering angle towards the turning inner side, in response to the yaw rate deviation after the brake operation is started.

On the other hand, according to the steering control device of the embodiment, as illustrated by a dashed line in FIG. 18, the target yaw rate is adjusted/limited, i.e. the second adjustment steering angle $\theta_2$ is adjusted/limited, on the basis of the friction coefficient μ or the turning state quantity TC. As a result, the yaw rate deviation is reduced, and the second adjustment steering angle $\theta_2$ is adjusted to be relatively small. In FIG. 18, the second adjustment steering angle $\theta_2$ is fixed at zero.

Therefore, in the case where the understeer occurs at the vehicle, the front-wheel steering angle is prevented from being adjusted to a direction by which the front-wheel steering angle is increased towards the turning inner side by the second adjustment steering angle $\theta_2$ (i.e. by the adjustment steering angle θmusp (see FIG. 2), more broadly by the counter-steering control). In other words, in the case where the vehicle travels on the low μ road surface or where the understeer tends to occur (or the understeer occurs) by the steering wheel operation, the second adjustment steering angle $\theta_2$ is determined to an appropriate value in preference to compensation for an error of the feed-forward control by the first adjustment steering angle $\theta_1$.

The second adjustment steering angle $\theta_2$ is calculated on the basis of the motion state quantity deviation ΔYr. Therefore, even if the adjustment/limitation is applied to the motion state quantity deviation ΔYr, or to the second adjustment steering angle $\theta_2$ itself, similar effects and advantages as described above are achieved.

The present invention is not limited to the above-described embodiment, and various modifications and changes may be applied. For example, in the above-described embodiment, the value, obtained by subtracting a sum of the longitudinal forces FXfl and FXrl of the front-left wheel FL and the rear-left wheel RL from a sum of the longitudinal forces FXfr and FXrr of the front-right wheel FR and the rear-right wheel RR, is used as the longitudinal force difference ΔFX between the right and left wheels (see equation 1). Alternatively, a value, obtained by subtracting the longitudinal force FXfl of the front-left wheel FL from the longitudinal force FXfr of the front-right wheel FR, may be used as the longitudinal force difference ΔFX between the right and left wheels. In a case where the longitudinal force difference corresponds to a braking force difference, a value, obtained by subtracting a braking force of the front-left wheel FL from a braking force of the front-right wheel FR, may be used as the longitudinal force difference ΔFX between the right and left wheels. In a case where the longitudinal force difference corresponds to a driving force difference, a value, obtained by subtracting a driving force of a left driving wheel from a driving force of a right driving wheel, may be used as the longitudinal force difference ΔFX between the right and left wheels.

Further, in the above-described embodiment, the steering wheel 21 is mechanically connected to the front-right wheel FR and the front-left wheel FL in the front-wheel steering control mechanism 20. The steering control device according to the embodiment is adaptable to a vehicle having a front-wheel steering control mechanism of a so-called steer-by-wire system in which the steering wheel 21 is not mechanically connected to the front-right wheel FR and the front-left wheel FL, i.e. the mechanisms executing the front-wheel steering control on the basis of an electric signal indicating the rotational angle θsw of the steering wheel 21. In this case, a rod-like member (i.e. a joystick) may be used as the steering operation member instead of the steering wheel 21.

The steering control device of the embodiment is adapted to the vehicle, in which the steering angle of the front-wheels is adjustable independently from the operation of the steering operation member by the driver, and the steering control device executes the front-wheel steering control shown in FIG. 2 by using the front-wheel steering control mechanism 20. Alternatively, the steering control device of the embodiment may be adapted to a vehicle in which a steering angle of the rear-wheels is adjustable independently from the operation of the steering operation member by the driver, so that a rear-wheel steering control, corresponding to the front-wheel steering control, may be executed by using a rear-wheel steering control mechanisms having an actuator such as an electric motor and the like that regulates the rear-wheel steering angle.

In the case where the steering control device is adapted to the vehicle to execute the rear-wheel steering control, the variable steering gear ratio control portion M0 for calculating the reference steering angle θvgr is replaced by a rear-wheel reference steering angle control portion for calculating a rear-wheel reference steering angle θbase, and a rotational angle of the electric motor provided in the rear-wheel steering control mechanisms is servo-controlled at the motor servo control portion M4 so that an actual steering angle θact of the rear-wheels corresponds to a target steering angle θref of the rear-wheels (i.e. θref=θbase+θmusp+θusos). For example, the rear-wheel reference steering angle θbase is determined to be a value equivalent to the front-wheel steering angle on the basis of the front-wheel steering angle and the vehicle speed.

The lower the friction coefficient μ is, or the greater the turning state quantity TC is, the more oversteer (i.e. the side-slip of the wheel) tends to occur. While the oversteer occurs, the actual motion state quantity Yr exceeds the target motion state quantity Yrt. Therefore, in order to approximate the motion state quantity deviation ΔYr to zero by reducing the actual motion state quantity Yr, the second adjustment steering angle $θ_2$ is determined to be the value directing to increase the rear-wheel steering angle towards the turning inner side.

Therefore, in the case where the first, second, third and the fourth embodiments of the feedback control portion M12 are adapted to the rear-wheel steering control, the smaller the friction coefficient μ is, or the greater the turning state quantity TC is (i.e., the more the side-slip of the wheel tends to occur), the smaller value the second adjustment steering angle $θ_2$ is determined to be, and at the same time the second adjustment steering angle $θ_2$ is determined to be the value directing to increase the rear-wheel steering angle towards the turning inner side.

Therefore, in the case where the oversteer occurs at the vehicle, the rear-wheel steering angle is prevented from being adjusted to the direction by which the rear-wheel steering angle is increased towards the turning inner side by the second adjustment steering angle $θ_2$ (i.e. by the adjustment steering angle θmusp (see FIG. 2), or more broadly by the counter-steering control). In other words, in the case where the vehicle travels on the low μ road surface or in the case where the oversteer tends to occur (or, the oversteer occurs) due to the operation of the steering wheel 21, the second adjustment steering angle $θ_2$ is determined to an appropriate value in preference to the compensation for the error of the feed-forward control by the first adjustment steering angle $θ_1$.

Alternatively, the steering control device having the above-described configuration may be adapted to a vehicle in which the steering angles of the front-wheels and the rear-wheels are adjustable independently from the operation of the steering operation member by the driver, so that both of the front-wheel steering control and the rear-wheel steering control are executed.

Additionally, in the above-described embodiment, the average friction coefficient μ of the road surface or the turning state quantity TC is used as an index value. Alternatively, a grip level ε based on a self-aligning torque may be used as the index value. The grip level ε is a value indicating a level of grip of the wheel in the lateral direction. For example, the grip level ε is calculated by using one of the known methods such as a method disclosed in JP2003-312465A.

Generally, the smaller the grip level ε is, the more the side-slip (the understeer or the oversteer) tends to occur at the wheel. Hence, the grip level ε may be described as a value indicating a probability of occurrence of the side-slip at the wheel.

The steering control device for the vehicle according to the embodiment is adapted to the vehicle that is configured to adjust the steering angle of the wheels (the steering wheel, the front-wheels and/or the rear-wheels) independently from the operation of the steering wheel 21 by the driver. The steering control device for the vehicle according to the embodiment includes the feedback control portion M12 for determining the first adjustment value, which corresponds to the steering angle of the front-wheels (steering wheel) (i.e. the value equivalent to the second adjustment steering angle $θ_2$) and which is the value directing to approximate the actual value Yr of the motion state quantity to the target value Yrt of the motion state quantity, on the basis of the actual value Yr of the motion state quantity in a yaw direction of the vehicle and the target value of the motion state quantity Yrt. Further, the steering control device for the vehicle according to the embodiment includes the motor servo control portion M4 for adjusting the steering angle of the front-wheels (the steering wheel) by modifying the wheel steering angle equivalent value based on the first adjustment value. The adjustment control on the steering angle of the steering wheel by the motor servo control portion M4 corresponds to the counter-steering control.

The value equivalent to the steering angle of the front-wheels (the steering wheel), i.e. the wheel steering angle equivalent value indicates, for example, in the case where the wheel to be controlled (steering wheel) is the front-wheel, the steering angle of the front-wheels, the rotational angle of the electric motor in the case where the variable steering gear ratio system (VGRS) for automatically regulating the ratio of the steering angle of the front-wheels relative to the rotational angle of the steering wheel 21 is used, a relative rotational angle between the upper steering shaft 22 and the lower steering shaft 23 between which the VGRS is inserted in the case where the VGRS is used, and the like. Further, in the case where the wheel (the steering wheel) to be controlled is the rear-wheel, the wheel steering angle equivalent value indicates the steering angle of the rear-wheels itself, the rotational angle of the electric motor, which serves as the actuator for regulating the rear-wheel steering angle, and the like.

The motion state quantity in the yaw direction of the vehicle indicates, for example, a yaw rate Yr generated as a result of a yaw motion of the vehicle, a value calculated by using the lateral acceleration Gy, and the like. The target value of the motion state quantity is determined, for example, on the basis of at least the operation (amount) of the steering wheel operation member, the vehicle speed Vx and the like.

For example, in the case where the adjustment control of the front-wheel steering angle is executed as the counter-steering control while the understeer occurs (i.e. in the case where the target value Yrt exceeds the actual value Yr of the motion state quantity), the first adjustment value is determined to be the value directing to increase the front-wheel steering angle towards the turning inner side in order to approximate the actual value Yr of the motion state quantity to the target value Yrt (i.e. in order to approximate the motion state quantity deviation ΔYr to zero). On the other hand, in the case where the adjustment control of the rear-wheel steering angle is executed as the counter-steering control while the oversteer occurs (i.e. in the case where the actual value Yr exceeds the target value Yrt of the motion state quantity), the first adjustment value is determined to be the value directing to increase the rear-wheel steering angle towards the turning inner side in order to approximate the actual value Yr of the motion state quantity to the target value Yrt (i.e. in order to approximate the motion state quantity deviation ΔYr to zero).

Further, it may be preferable to execute the counter-steering control (i.e. the control by the motor servo control portion M4) while the brake operation is performed or while the acceleration operation is performed, more specifically, for example, while the slip restraining control including the anti-skid control and the traction control for restraining the occurrence of the slip at the wheel is executed.

According to the steering control device of the embodiment, the feedback control portion M12 includes the friction coefficient calculation portion A24 and the turning state quantity calculation portion A25 for obtaining the index value indicating the probability of the occurrence of the side-slip of the wheel in the vehicle, more specifically, the probability of the occurrence of the understeer, the oversteer and the like, and the second adjustment steering angle regulation portion A26 for regulating the first adjustment value so that the more the side-slide of the vehicle tends to occur (i.e. the greater the index value is), the smaller the first adjustment value is adjusted to be. The index value indicates, for example, the friction coefficient μ of the road surface, the longitudinal acceleration of the vehicle Gx, the lateral acceleration Gy, the turning state quantity TC, the grip level ε based on the self-aligning torque of the rear-wheels, and the like.

Accordingly, the steering angle of the wheel is adjusted on the basis of the feedback control using the first adjustment value based on the motion state quantity (deviation) (which corresponds to the second adjustment steering angle $\theta_2$), thereby restraining the vehicle from being deflected while the μ split control is executed.

Additionally, for example, in the case where the adjustment control of the front-wheel steering angle is executed as the counter-steering control, the first adjustment value is regulated to a relatively small value while the vehicle travels on the road surface having the constant μ and the vehicle is under the state where the understeer tends to occur, or under the state where the understeer occurs. As a result, the front-wheel steering angle is prevented from being adjusted by the first adjustment value in the direction by which the front-wheel steering angle is increased towards the turning inner side. In other words, in the case where the understeer tends to occur, the first adjustment value (which corresponds to the second adjustment steering angle $\theta_2$) is determined to be an appropriate value. Similarly, in the case where the adjustment control of the rear-wheel steering angle is executed as the counter-steering control, the first adjustment value is regulated to a relatively small value while the vehicle travels on the road surface having the constant μ and the vehicle is under the state where the oversteer tends to occur, or under the state where the oversteer occurs. As a result, the rear-wheel steering angle is prevented from being adjusted by the first adjustment value in the direction by which the rear-wheel steering angle is increased towards the turning inner side. In other words, in the case where the oversteer tends to occur, the first adjustment value (which corresponds to the second adjustment steering angle $\theta_2$) is determined to an appropriate value.

In the case where the motor servo control portion M4 is configured to adjust the steering angle of the front-wheels, the second adjustment steering angle regulation portion A26 may preferably be configured to regulate the first adjustment value so that the greater the probability of the occurrence of the side-slip of the vehicle, indicated by the index value, is, the smaller value the first adjustment value is set at, while the understeer occurs. Similarly, in the case where the motor servo control portion M4 is configured to adjust the steering wheel of the rear-wheels, the second adjustment steering angle regulation portion A26 may preferably be configured to regulate the first adjustment value so that the greater the probability of the occurrence of the side-slip of the vehicle, indicated by the index value, is, the smaller value the first adjustment value is set at, while the oversteer occurs.

The steering control device for the vehicle according to the embodiment includes the ECU 0 for executing the slip restraining control by which the occurrence of the slip at the wheel is restrained by regulating the longitudinal forces of the wheels provided at the vehicle, and the feed-forward control portion M11 for determining the second adjustment value of the wheel steering angle equivalent value (which corresponds to the first adjustment steering angle $\theta_1$), which is the value directing to restraining the deflection of the vehicle occurring due to the longitudinal force difference, on the basis of the longitudinal force difference between the right and left wheels in the case where the slip restraining control (μ split control) is executed while the vehicle travels on the μ split road surface, in which friction coefficients differ in lateral the direction of the vehicle (i.e. the friction coefficient of the road surface contacting the right-wheels differs from the friction coefficient of the road surface contacting the left-wheels). The motor servo control portion M4 may preferably be configured to adjust the steering angle of the wheels by modifying the wheel steering angle equivalent value on the basis of the first and second adjustment values. The longitudinal force difference between the right and left wheels indicates the difference between the longitudinal force of the right-wheels and the longitudinal force of the left-wheels, more specifically, the difference between the sum of the longitudinal forces of the two right-wheels and the sum of the longitudinal forces of the two left-wheels, the difference between the longitudinal force of the front-right wheel and the longitudinal force of the front-left wheel, the difference between the longitudinal force of the rear-right wheel and the longitudinal force of the rear-left wheel, and the like.

Accordingly, the steering angle of the wheel is adjusted by using the feed-forward control using the second adjustment value, which corresponds to the first adjustment steering angle $\theta_1$, based on the longitudinal force difference between the right and left wheels, in addition to the feedback control using the first adjustment value, which corresponds to the second adjustment steering angle $\theta_2$, based on the motion state quantity (deviation). The longitudinal force difference between the right and left wheels causes the deflection of the vehicle while the μ split control is executed. Therefore, the steering angle of the wheel is adjusted to an appropriate value in order to restrain the vehicle from deflecting, as a result, the vehicle deflection is effectively restrained while the μ split control is executed.

The steering control device of the embodiment further includes the US/OS control portion M2 for determining the third adjustment value of the wheel steering angle equivalent value, which is the value directing to return the steering angle of the steering wheel to the neutral position (zero), on the basis of a level of the understeer or the oversteer, in the case where the understeer or the oversteer occurs at the vehicle. The motor servo control portion M4 may preferably be configured to adjust the steering angle of the wheel by modifying the wheel steering angle equivalent value on the basis of the first and the third adjustment values.

Accordingly, in the case where the understeer or the oversteer occurs while the adjustment control of the front-wheel steering angle is executed as the counter-steering control, the front-wheel steering angle is actively adjusted in a direction towards the neutral position on the basis of the third adjustment value. Similarly, in the case where the understeer or the oversteer occurs while the adjustment control of the rear-wheel steering angle is executed as the counter-steering control, the rear-wheel steering angle is actively adjusted in a direction towards the neutral position on the basis of the third adjustment value. As a result, in either case, a directional stability of the vehicle is achieved.

The steering control device for the vehicle according to the embodiment may be described that the steering control device includes the VGR control portion M0 for determining the reference value of the wheel steering angle equivalent value (which corresponds to the reference steering angle θvgr) on the basis of the operation of the steering wheel 21 by the driver, the feedback control portion M12, which includes the friction coefficient calculation portion A24, the turning state quantity calculation portion A25 and the second adjustment steering angle regulation portion A26, the target steering angle calculation portion M3 for determining the target value of the wheel steering angle equivalent value by modifying the reference value by using the first adjustment value, and the motor servo control portion M4 for controlling the steering angle of the wheels so that the actual value Yr of the wheel steering angle equivalent value corresponds to the target value Yrt of the wheel steering angle equivalent value. Further the steering control device for the vehicle according to the embodiment may be described that the steering control device includes the VGR control portion M0 for determining the reference value of the wheel steering angle equivalent value (which corresponds to the reference steering angle θvgr) on the basis of the operation of the steering wheel 21 by the driver, the feedback control portion M12, which includes the friction coefficient calculation portion A24, the turning state quantity calculation portion A25 and the second adjustment steering angle regulation portion A26, the feed-forward control portion M11, the US/OS control portion M2, the target steering angle calculation portion M3 for determining the target value of the wheel steering angle equivalent value by modifying the reference value by using the first, second and third adjustment values, and the motor servo control portion M4 for controlling the steering angle of the wheels so that the actual value Yr of the wheel steering angle equivalent value corresponds to the target value Yrt of the wheel steering angle equivalent value. The reference value of the wheel steering angle equivalent value is determined on the basis of, for example, the operation of the steering wheel 21 (i.e. the operation amount of the steering operation member from the neutral position that corresponds to the state where the vehicle travels straight), the vehicle speed Vx and the like.

The steering control device for the vehicle according to the embodiment may preferably be modified so that the friction coefficient calculation portion A24 and the turning state quantity calculation portion A25 obtain the average friction coefficient μ of the road surface on which the vehicle travels as the index value, and so that the second adjustment steering angle regulation portion A26 regulates the first adjustment value in the manner where the smaller the friction coefficient μ is, the smaller value the first adjustment values is adjusted to. The average friction coefficient μ indicates an average value between the friction coefficients of the road surfaces contacting each wheel, or a value equivalent to the average value. The average friction coefficient μ is calculated, for example, on the basis of the longitudinal acceleration Gx and the lateral acceleration Gy of the vehicle.

Generally, the smaller the average friction coefficient μ of the road surface is, the less the side-slip (i.e. the understeer or the oversteer) of the wheel tends to occur. Hence, the average friction coefficient μ of the road surface may be utilized as the value indicating the probability of the occurrence of the side-slip at the wheel. Accordingly, the steering control device for the vehicle of the embodiment utilizes the average friction coefficient μ of the road surface. Additionally, in the case where the vehicle travels on the μ split road surface, because either the right side or the left side road surface has a high μ, the average friction coefficient μ is calculated to a relatively great value. Therefore, the first adjustment value is less likely to be adjusted to a relatively small value. As a result, the vehicle deflection caused by the longitudinal force difference is appropriately restrained by the feedback control using the first adjustment value.

In this case, if the friction coefficient μ is less than the first predetermined value μ1, the first adjustment value may be set to zero. Accordingly, in the case where the average friction coefficient μ is small, i.e. in the case where the vehicle is in the state where the slide-slip tends to occur at the wheel, the steering wheel of the wheel is surely prevented from being adjusted by the first adjustment value in the direction by which the steering angle of the wheel is increased towards the turning inner side.

In the steering control device for the vehicle according to the embodiment, the friction coefficient calculation portion A24 and the turning state quantity calculation portion A25 may be modified to obtain the turning state quantity TC of the vehicle as the index value on the basis of the operation amount of the steering wheel 21, and the second adjustment steering angle regulation portion A26 may be modified to regulate the first adjustment value so that the greater the turning state quantity TC is, the smaller value the adjustment value is regulated to be. The turning state quantity TC becomes zero when, for example, the operation amount of the steering wheel 21 is zero, more specifically, when the operation amount of the steering wheel 21 from the neutral position that corresponds to the state where the vehicle travels straight is zero. Further, the turning state quantity TC is determined to be a greater value as the operation amount of the steering wheel 21 is increased.

Generally, the greater the turning state quantity TC is, more specifically, the greater the operation amount of the steering wheel 21 (from the neutral position corresponding to the state where the vehicle travels straight) is, the more the side-slip of the wheel (i.e. the understeer or the oversteer) tends to occur. In other words, the turning state quantity TC may represent the value indicating probability of the occurrence of the side-slip of the wheel.

In this case, when the turning state quantity TC is greater than the second predetermined value TC1, the first adjustment value may be set to zero. Accordingly, in the case where the turning state quantity TC is greater, i.e. in the case where the vehicle is in the state where the slide-slip tends to occur at the wheel, the steering angle of the wheel is surely inhibited from being adjusted by the first adjustment value in the direction by which the steering angle of the wheel is increased towards the turning inner side.

The second predetermined value TC1 may be set to zero. Accordingly, in the case where the turning state quantity TC is zero, in other words, in the case where the vehicle travels straight (i.e. in the case where the vehicle is in the state where the slide-slip of the wheel does not occur), the steering angle of the wheel is adjusted on the basis of the first adjustment value. Therefore, the vehicle deflection occurring due to the longitudinal force difference is appropriately restrained from occurring by the feedback control using the first adjustment value. On the other hand, in the case where the turning state quantity TC is greater than zero, in other words, in the case where the vehicle is in a turning state (i.e. in the case where the vehicle is in the state where the slide-slip of the wheel is possible to occur), the adjustment of the steering angle of the wheel based on the first adjustment value is not executed. As a result, the steering angle of the wheel is surely inhibited from being adjusted by the first adjustment value in the direction by which the steering angle of the wheel is increased.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the sprit of the present invention. Accordingly, it is expressly intended that all such variations, changes and equivalents which fall within the spirit and scope of the present invention as defined in the claims, be embraced thereby.

The invention claimed is:

1. A steering control device for a vehicle, which is adapted to the vehicle that is configured to adjust a steering angle of a wheel independently from an operation of a steering operation member by a driver, comprising:

a first adjustment value determination means for determining a first adjustment value of a value corresponding to the steering angle of the wheel on the basis of an actual value of turning state quantity and a target value of turning state quantity in a yaw direction of the vehicle, the first adjustment value is a value directing to approximate the actual value of turning state quantity to the target value of turning state quantity; and a steering control means for adjusting the steering angle of the wheel by modifying the value corresponding to the steering angle of the wheel on the basis of the first adjustment value, wherein the first adjustment value determination means includes an index value obtaining means for obtaining an index value indicating a probability of an occurrence of a side-slip of the wheel and a regulation means for regulating the first adjustment value so that the greater the probability of the occurrence of the side-slip of the wheel, indicated by the index value, is, the smaller the first adjustment value is set to be.

2. The steering control device for the vehicle according to claim 1 further including a slip restraining means for executing a slip restraining control for restraining the slip at the wheel by regulating a longitudinal force of the wheel of the vehicle, and a second adjustment value determination means for determining a second adjustment value of the value corresponding to the steering angle of the wheel on the basis of the longitudinal force difference between a right-wheel and a left-wheel generated in a case where the vehicle travels on a road surface having different friction coefficients between a road surface contacting the right-wheel and a road surface contacting the left-wheel while the slip restraining control is executed, the second adjustment value is a value directing to restrain a deflection of the vehicle occurring due to a longitudinal force difference, wherein the steering angle control means is configured to adjust the steering angle of the wheel by modifying the value corresponding to the steering angle of the wheel on the basis of the first and second adjustment values.

3. The steering control device for the vehicle according to claim 1 further including a third adjustment value determination means for determining a third adjustment value of the value corresponding to the steering angle of the wheel on the basis of a level of an understeer or an oversteer in a case where the understeer or the oversteer occurs at the vehicle, the third adjustment value is a value directing to return the steering angle of the wheel to a neutral position, wherein the steering angle control means is configured to adjust the steering angle of the wheel by modifying the value corresponding to the steering angle of the wheel on the basis of the first and third adjustment values.

* * * * *